United States Patent
Srinivas

(10) Patent No.: US 7,459,103 B2
(45) Date of Patent: *Dec. 2, 2008

(54) CONDUCTING POLYMER-GRAFTED CARBON MATERIAL FOR FUEL CELL APPLICATIONS

(75) Inventor: Bollepalli Srinivas, Marietta, GA (US)

(73) Assignee: Columbian Chemicals Company, Marietta, GA (US)

( * ) Notice: Subject to any disclaimer, the term of this patent is extended or adjusted under 35 U.S.C. 154(b) by 556 days.

This patent is subject to a terminal disclaimer.

(21) Appl. No.: 10/786,651

(22) Filed: Feb. 25, 2004

(65) Prior Publication Data

US 2004/0166401 A1    Aug. 26, 2004

Related U.S. Application Data

(63) Continuation-in-part of application No. 10/445,090, filed on May 23, 2003, now Pat. No. 7,175,930.

(60) Provisional application No. 60/382,666, filed on May 23, 2002.

(51) Int. Cl.
*H01B 1/00* (2006.01)
(52) U.S. Cl. ............... 252/500; 252/511; 252/512; 252/520.3; 252/514
(58) Field of Classification Search ............ 252/520.3, 252/511, 512, 514, 500
See application file for complete search history.

(56) References Cited

U.S. PATENT DOCUMENTS 3,279,935 A    10/1966  Daniell et al.
3,442,679 A    5/1969   Rivin et al.
3,519,452 A    7/1970   Rivin et al.
3,528,840 A    9/1970   Aboytes
3,853,933 A    12/1974  Siciliano
3,870,841 A    3/1975   Makowski et al.
4,014,844 A    3/1977   Vidal et al. ............. 260/31.2 R
4,081,409 A    3/1978   McNicol et al.

(Continued)

FOREIGN PATENT DOCUMENTS

EA          009587       2/2008

(Continued)

OTHER PUBLICATIONS

Ferraris, John P., et al.; "Grafting of buckminsterfullerene onto polythiophene: novel intramolecular donor—acceptor polymers"; Optical Materials 9 (1998) p. 34-42.

(Continued)

*Primary Examiner*—Mark Kopec
*Assistant Examiner*—Jaison P Thomas
(74) *Attorney, Agent, or Firm*—Ballard Spahr Andrews & Ingersoll, LLP

(57) ABSTRACT

A composition comprising particulate carbonaceous material and a conducting polymer containing hetero atoms. The composition can further comprise a metal. Devices comprising the composition can be constructed including supported electrocatalysts, membrane electrode assemblies, and fuel cells. A method for preparing the composition comprises oxidatively polymerizing with ozone a monomer of a conducting polymer containing hetero atoms in the presence of a carbonaceous material. The method grafts the conducting polymer to the carbonaceous material. The method can further comprise metallizing the polymer-grafted carbonaceous material.

14 Claims, 10 Drawing Sheets

U.S. PATENT DOCUMENTS

| | | | |
|---|---|---|---|
| 4,237,323 A | 12/1980 | Aliev et al. | |
| 4,241,112 A | 12/1980 | Kostandov et al. | |
| 4,552,786 A | 11/1985 | Berneburg et al. | |
| 4,582,731 A | 4/1986 | Smith | |
| 4,610,938 A | 9/1986 | Appleby | 429/42 |
| 4,714,569 A | 12/1987 | Nishino et al. | 252/511 |
| 4,731,408 A * | 3/1988 | Jasne | 524/458 |
| 4,734,227 A | 3/1988 | Smith | |
| 4,737,384 A | 4/1988 | Murthy et al. | |
| 4,880,711 A | 11/1989 | Luczak et al. | |
| 4,970,093 A | 11/1990 | Sievers et al. | |
| 5,068,161 A | 11/1991 | Keck et al. | |
| 5,152,801 A | 10/1992 | Altermatt et al. | |
| 5,156,651 A | 10/1992 | Girardeau et al. | |
| 5,290,483 A | 3/1994 | Kulkarni et al. | |
| 5,316,990 A | 5/1994 | Cooper et al. | |
| 5,334,292 A | 8/1994 | Rajeshwar et al. | |
| 5,346,780 A | 9/1994 | Suzuki | |
| 5,356,538 A | 10/1994 | Wai et al. | |
| 5,498,372 A | 3/1996 | Hedges | |
| 5,548,060 A | 8/1996 | Allcock et al. | |
| 5,554,739 A | 9/1996 | Belmont | 534/885 |
| 5,571,311 A | 11/1996 | Belmont et al. | 106/20 R |
| 5,595,689 A | 1/1997 | Kulkarni et al. | |
| 5,606,724 A | 2/1997 | Wai et al. | |
| 5,630,868 A | 5/1997 | Belmont et al. | 106/31.75 |
| 5,639,441 A | 6/1997 | Sievers et al. | |
| 5,672,198 A | 9/1997 | Belmont | 106/20 |
| 5,683,829 A | 11/1997 | Sarangapani | 429/42 |
| 5,707,432 A | 1/1998 | Adams et al. | 106/31.6 |
| 5,759,944 A | 6/1998 | Buchanan et al. | |
| 5,767,036 A | 6/1998 | Freund et al. | |
| 5,789,027 A | 8/1998 | Watkins et al. | |
| 5,803,959 A | 9/1998 | Johnson et al. | 106/31.75 |
| 5,837,045 A | 11/1998 | Johnson et al. | 106/31.85 |
| 5,851,280 A | 12/1998 | Belmont et al. | 106/472 |
| 5,871,671 A | 2/1999 | Kinlen et al. | |
| 5,900,029 A | 5/1999 | Belmont et al. | |
| 5,928,419 A | 7/1999 | Uemura et al. | |
| 5,932,144 A | 8/1999 | Shimizu et al. | |
| 5,939,334 A | 8/1999 | Nguyen et al. | |
| 5,976,233 A | 11/1999 | Osumi et al. | |
| 5,993,996 A | 11/1999 | Firsich | |
| 6,042,643 A | 3/2000 | Belmont et al. | |
| 6,096,284 A | 8/2000 | Kanamaru | |
| 6,117,581 A | 9/2000 | Shelef | |
| 6,132,491 A | 10/2000 | Wai et al. | |
| 6,132,645 A | 10/2000 | Hedges | 252/510 |
| 6,280,871 B1 | 8/2001 | Tosco et al. | 429/41 |
| 6,399,202 B1 | 6/2002 | Yu et al. | 428/403 |
| 6,451,375 B1 | 9/2002 | Cotte et al. | |
| 6,478,987 B1 | 11/2002 | Akita et al. | |
| 6,494,946 B1 | 12/2002 | Belmont et al. | |
| 6,524,383 B2 | 2/2003 | Komatsu et al. | |
| 6,541,278 B2 | 4/2003 | Morita et al. | |
| 6,572,227 B2 | 6/2003 | Yamashita et al. | |
| 6,592,938 B1 | 7/2003 | Pessey et al. | |
| 6,767,664 B2 | 7/2004 | Akita et al. | 429/42 |
| 6,770,393 B2 | 8/2004 | Akita et al. | 429/33 |
| 7,241,334 B2 | 7/2007 | Srinivas | |
| 2001/0009733 A1 | 7/2001 | Campbell et al. | 29/44 |
| 2001/0024749 A1 | 9/2001 | Michot et al. | 429/122 |
| 2002/0006982 A1 | 1/2002 | Kurabayashi | |
| 2002/0020318 A1 | 2/2002 | Galloway et al. | |
| 2002/0088375 A1 | 7/2002 | Komatsu et al. | |
| 2003/0022055 A1 | 1/2003 | Menashi | 429/44 |
| 2003/0079643 A1 | 5/2003 | Tomioka et al. | |
| 2003/0095914 A1 | 5/2003 | Belmont et al. | |
| 2003/0113611 A1 | 6/2003 | Abe et al. | 429/43 |
| 2004/0042955 A1 | 3/2004 | Srinivas | 423/460 |
| 2004/0072683 A1 | 4/2004 | Kodas et al. | 502/224 |
| 2004/0094750 A1 * | 5/2004 | Widagdo et al. | 252/500 |
| 2004/0109816 A1 | 6/2004 | Srinivas et al. | 423/449.2 |
| 2004/0110051 A1 | 6/2004 | Srinivas | 429/33 |
| 2004/0110052 A1 | 6/2004 | Srinivas | 429/33 |
| 2004/0144961 A1 | 7/2004 | Srinivas | 252/500 |
| 2004/0169165 A1 | 9/2004 | Srinivas | 252/511 |
| 2004/0186201 A1 | 9/2004 | Stoffer et al. | 523/215 |
| 2004/0238799 A1 | 12/2004 | Hwang et al. | |
| 2006/0068987 A1 | 3/2006 | Bollepalli et al. | |
| 2006/0099485 A1 | 5/2006 | Yamaguchi et al. | 429/42 |

FOREIGN PATENT DOCUMENTS

| | | |
|---|---|---|
| EP | 0 360 399 A2 | 3/1990 |
| EP | 0 466 261 A1 | 1/1992 |
| EP | 1 085 034 A1 | 3/2001 |
| EP | 1 536 500 A1 | 6/2005 |
| EP | 1509930 B1 | 2/2007 |
| JP | 59075943 | 4/1984 |
| JP | 62109821 | 5/1987 |
| JP | 3245850 | 11/1991 |
| JP | 8022827 | 1/1996 |
| JP | 2001-283865 | 10/2001 |
| JP | 2002-237229 | 8/2002 |
| JP | 2003-037435 | 2/2003 |
| WO | WO 01/15253 A1 | 3/2001 |
| WO | WO 01/45121 A1 | 6/2001 |
| WO | WO 02/084767 A2 | 10/2002 |
| WO | WO 03/099946 A1 | 12/2003 |
| WO | WO 03/100883 A2 | 12/2003 |
| WO | WO 03/100884 A2 | 12/2003 |
| WO | WO 03/100889 A1 | 12/2003 |
| WO | WO 2004/017446 A1 | 2/2004 |
| WO | WO 2004/107359 A1 | 12/2004 |
| WO | WO 2006/036544 A2 | 4/2006 |

OTHER PUBLICATIONS

Tsubokawa et al., "Grafting of Polyesters onto Carbon Black VI. Copolymerization of Alkylene Carbonate with Cyclic Acide Anhydride Initiated by Alkai Metal Carboxylate Groups on Carbon Black Surface," *Journal of Polymer Science: Polymer Chemistry Edition*, 23:489-500 (1985).

Tsubokawa et al., "Grafting of Polyesters on Carbon Black V. Preparation of Polyester-Grafted Carbon Black with a Higher Grafting Ration by the Copolymerization of Epoxide with Cyclic Acid Anhydrides Using COOK Groups on Carbon Black as the Initiator," *Polymer Journal*, 16(4):333-340 (1984).

Tsubokawa et al., "Grafting of Polyesters onto Carbon Black. III. Polymerization of β-Propiolactone Initiated by Quaternary Ammonium Carboxylate Groups on the Surface of Carbon Black," *Journal of Applied Polymer Science*, 28:2381-2387 (1983).

Tsubokawa et al., "Grafting of Polyesters onto Carbon Black. II. Effect of Temperature Solvent on the Polymerization of β-Propiolactone initiated by COOK Groups on the Surface of Carbon Black," *Polymer Bulletin*, 7:589-596 (1982).

Tsubokawa et al., "Grafting of Polyesters onto Carbon Black. I. Polymerization of β-Propiolactone Initiated by Alkali Metal Carboxylate Group on the Surface of Carbon Black," *Journal of Polymer Science: Polymer Chemistry Edition*, 20:3297-3304 (1982).

Tsubokawa et al., "Reaction of Carbon Black Surface with Polymer Radicals Formed by the Thermal Decomposition of Azo or Peroxide Polymers," *1995 Kobe International Rubber Conference*, Oct. 23-27, 1995, p. 307-310, 012, Kobe, Japan.

Mizuhata et al., "Morphological Control of PEMFC Electrode by Graft Polymerization of Polymer Electrolyte onto Platinum-Supported Carbon Black," *Journal of Power Sources*, 138:25-30 (2004).

Raven® 3600 Ultra publication, Columbian Chemicals Company (Feb. 2004).

Raven Blacks publication, Columbian Chemicals Company (2004).

Uchida et al., "Effects of Microstructure of Carbon Support in the Catalyst Layer on the Performance of Polymer-Electrolyte Fuel Cells," *J. Electrochem. Soc.*, 143(7):2245-2252 (1996).

Löffler et al., "Activity and Durability of Water-Gas Shift Catalysts Used for the Steam Reforming of Methanol," *Journal of Power Sources*, 114(1):15-20 (2003).

Morrison et al., "Step-Reaction Polymerization," *Organic Chemistry*, Fifth Edition, Sec. 36.7:1249-1252 (1987).

Wei et al., "Stablization of Platinized Carbon Catalysts for PAFC," *Journal of Applied Electrochemistry*, 30:723-725 (2000).

Blackburn et al., "Reactive Deposition of Conformal Palladium Films from Supercritical Carbon Dioxide Solution," *Chemistry of Materials*, 12:2625-2631 (2000).

Blackburn et al., "Deposition of Conformal Copper and Nickel Films from Supercritical Carbon Dioxide," *Science*, 294:141-145 (2001).

Cabanas et al., "A Continuous and Clean One-Step Synthesis of Nano-Particulate $Ce_{1-x}Zr_xO_2$ Solid Solutions in Near-Critical Water," *Chemical Communications*, 11:901-902 (2000).

Cansell et al., "Supercritical Fluid Processing: A New Route for Material Synthesis," *Journal of Materials Chemistry*, 9:67-75 (1999).

Johnston, "Safer Solutions for Chemists," *Nature*, 368:187-188 (1994).

Kaupp, "Reactions in Supercritical Carbon Dioxide," *Angewandte Chemie*, 33:1452-1455 (1994).

Kordikowski et al., "Resolution of Ephedrine in Supercritical $CO_2$: A Novel Technique for the Separation of Chiral Drugs," *J. Pharm. Sci.*, 88:786-791 (1999).

Long et al., "Chemical Fluid Deposition: A Hybrid Technique for Low-Temperature Metallization," *Advanced Materials*, 12:913-915 (2000).

Park et al., "Formation of Nylon Particles and Fibers Using Precipitation with a Compressed Antisolvent," *Industrial & Eng. Chem. Res.*, 41:1504-1510 (2002).

Shah et al., "Steric Stablization of Nanocrystals in Supercitial $CO_2$ Using Fluorinated Ligands," *J. Am. Chem. Soc.*, 122:4245-4246 (2000).

Watkins et al., "Chemical Fluid Depoisiton: Reactive Deposition of Platinum Metal from Carbon Dioxide Solution," *Chemistry of Materials*, 11:213-215 (1999).

Watkins et al., "Polymer/Metal Nanocomposites in Supercritical $CO_2$," *Chemistry of Materials*, 7:1991-1994 (1995).

Watkins et al., "Polymerization of Styrene in Supercritical $CO_2$-Swollen Poly(chlorotrifluoroethylene)," *Macromolecules*, 28:4067-4074 (1995).

Internet website for Sigma-Aldrich for Product No. 530565, "Polyaniline (emeraldine salt)—composite with carbon black," www.sigmaaldrich.com (Apr. 6, 2004).

Internet website for Sigma-Aldrich for Product No. 530573, "Polypyrrole—composite with carbon black," www.sigmaaldrich.com (Apr. 6, 2004).

Lefebvre et al., "Electronically Conducting Proton Exchange Polymers as Catalyst Supports for Proton Exchange Membrane Fuel Cells," *Journal of Electrochemical Society*, 146(6):2054-2058 (1999).

Product Brochure entitled "Raven Blacks," published by Columbian Chemicals Company, Marietta, Georgia (Oct. 1999).

Tsubokawa, "Functionalization of Carbon Black by Surface Grafting of Polymers," *Prog. Polym. Sci.*, 17:417-470 (1992).

Wei et al., "Synthesis of Highly Sulfonated Polyaniline," *Synthetic Metals*, 74:123-125 (1995).

Chao et al., "A Study of Polypyrrole Synthesized with Oxidative Transition Metal Ions," *Journal of Polymer Science, Part A: Polymer Chemistry*, 26:743-753 (1988).

Wampler et al., "Composites of Polypyrrole and Carbon Black: Part III. Chemical Synthesis and Characterization," *Journal of Materials Research*, 10(7):1811-1822 (1995).

Wood, Greg A. et al.; "Effect of Electrolytes on the Kinetics and Mechanism of the Electropolymerization of Pyrrole on to Carbon Fibers"; Eur. Polym. J. 33 (1997), pp. 107-114.

* cited by examiner

CONDUCTING POLYMER-GRAFTED CARBON MATERIAL FOR FUEL CELL APPLICATIONS

CROSS REFERENCE TO RELATED APPLICATIONS

This application is a continuation-in-part of U.S. patent application Ser. No. 10/445,090, filed May 23, 2003 now U.S. Pat. No. 7,175,930, which claims priority to U.S. Provisional Application Ser. No. 60/382,666 filed May 23, 2002, both of which are hereby incorporated by reference.

BACKGROUND OF THE INVENTION

1. Field of the Invention

This invention relates generally to particulate conductive carbons. The invention also relates to supported catalysts for fuel cells and proton exchange membranes.

2. Background

A fuel cell (FC) is a device that converts energy of a chemical reaction into electrical energy (electrochemical device) without combustion. A fuel cell (see e.g., FIG. 1) generally comprises an anode 20, cathode 50, electrolyte 10, backing layers 30, 60, and flow fields/current collectors 40, 70. There are five types of fuel cells, as defined by their electrolytes:

energy. Fuel cells can have 2-3 times greater efficiency than internal combustion engines and can use abundant and/or renewable fuels. Fuel cells produce electricity, water, and heat using fuel 90 and oxygen 80. Water (liquid and vapor) is the only emission when hydrogen is the fuel.

Since the voltage of a typical fuel cell is small, they are usually stacked in series.

The two half-reactions normally occur very slowly at the low operating temperature of the fuel cell, thus catalysts 56 are used on one or both the anode 20 and cathode 50 to increase the rates of each half reaction. Platinum (Pt) has been the most effective noble metal catalyst 56 to date because it is able to generate high enough rates of $O_2$ reduction at the relatively low temperatures of the PEM fuel cells. Kinetic performance of PEM fuel cells is limited primarily by the slow rate of the $O_2$ reduction half reaction (cathode reaction) which is more than 100 times slower than the $H_2$ oxidation half reaction (anode reaction). The $O_2$ reduction half reaction is also limited by mass transfer issues.

As fuel 90, such as hydrogen, flows into a fuel cell on the anode side, a catalyst 56 facilitates the separation of the hydrogen gas fuel into electrons and protons (hydrogen ions). The hydrogen ions pass through the membrane 10 (center of fuel cell) and, again with the help of the catalyst 56, combine with an oxidant 80, such as oxygen, and electrons on the cathode side, producing water. The electrons, which cannot

| Type | Electrolyte | Temperature | Comments |
|---|---|---|---|
| Phosphoric acid (PAFC) | Liquid phosphoric acid soaked in a matrix | 175-200° C. | Stationary power, commercially available |
| Molten carbonate (MCFC) | Liquid solution of lithium, sodium and/or potassium carbonates, soaked in a matrix | 600-1200° C. | Molten carbonate salts, high efficiency |
| Solid oxide (SOFC) | Solid zirconium oxide to which a small amount of ytrria is added | 600-1800° C. | Ceramic, high power, industrial applications |
| Alkaline (AFC) | Aqueous solution of potassium hydroxide soaked in a matrix | 90-100° C. | Potassium hydroxide electrolyte, NASA, very expensive |
| **Proton exchange membrane (PEM) | Solid organic polymer polyperfluorosulfonic acid | 60-100° C. | Ionomer membrane, high power density, can vary output quickly, portable/auto applications |
| Direct Methanol (DMFC) | | 60-100° C. | PEM that uses methanol for fuel |

**= Currently of most interest

The current description deals with proton exchange membrane (a.k.a. polymer electrolyte membrane) (PEM) fuel cells (a.k.a. solid polymer electrolyte (SPE) fuel cell, polymer electrolyte fuel cell, and solid polymer membrane (SPM) fuel cell). A polymer electrolyte membrane fuel cell (PEMFC) comprises a proton conductive polymer membrane electrolyte 10 sandwiched between electrocatalysts (a cathode 50 and an anode 20) (see, e.g., FIG. 1).

The oxidation and reduction reactions occurring within the fuel cell are:

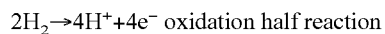 oxidation half reaction

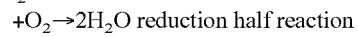 reduction half reaction

This electrochemical process is a non-combustion process which does not generate airborne pollutants. Therefore, fuel cells are a clean, low emission, highly efficient source of pass through the membrane 10, flow from the anode 20 to the cathode 50 through an external circuit containing a motor or other electrical load, which consumes the power generated by the cell.

A catalyst 56 is used to induce the desired electrochemical reactions at the electrodes 20, 50. The catalyst 56 is often incorporated at the electrode/electrolyte interface by coating a slurry of the electrocatalyst particles 56 to the electrolyte 10 surface. When hydrogen or methanol fuel feed 90 through the anode catalyst/electrolyte interface, electrochemical reaction occurs, generating protons and electrons. The electrically conductive anode 20 is connected to an external circuit, which carries electrons by producing electric current. The polymer electrolyte 10 is typically a proton conductor, and protons generated at the anode catalyst migrate through the electrolyte 10 to the cathode 50. At the cathode catalyst interface, the protons combine with electrons and oxygen to give water.

The catalyst 56 is typically a particulate metal such as platinum and is dispersed on a high surface area electronically conductive support 52.

The electronically conductive support material 52 in the PEMFC typically consists of carbon particles. Carbon has an electrical conductivity ($10^{-1}$-$10^{-2}$ S/cm) which helps facilitate the passage of electrons from the catalyst 56 to the external circuit. Proton conductive materials 54 such as Nafion® are often added to facilitate transfer of the protons from the catalyst 56 to the membrane interface.

To promote the formation and transfer of the protons and the electrons and to prevent drying out of the membrane 10, the fuel cells are operated under humidified conditions. To generate these conditions, hydrogen fuel 90 and oxygen 80 gases are humidified prior to entry into the fuel cell. In a supported electrocatalyst (52+56), carbon is relatively hydrophobic, and as such, the boundary contact between the reactive gases, water and the surface of the solid electrodes made of carbon contributes to high electrical contact resistance and ohmic power loss in the fuel cell resulting in lower efficiency of the fuel cell.

In the present invention, the hetero atom-containing conductive polymer-grafted carbon material shows hydrophilic character and thereby enhances the humidification process. Also, the higher electronic conductivity of these polymers facilitates the electron transfer process.

An ordinary electrolyte is a substance that dissociates into positively charged and negatively charged ions in the presence of water, thereby making the water solution electrically conducting. The electrolyte in a PEM fuel cell is a polymer membrane 10. Typically, the membrane material (e.g., Nafion®) varies in thickness from 50-175 µm. Polymer electrolyte membranes 10 are somewhat unusual electrolytes in that, in the presence of water, which the membrane 10 readily absorbs, the negative ions are readily held within their structure. Only the protons contained within the membrane 10 are mobile and free to carry positive charge through the membrane 10. Without this movement within the cell, the circuit remains open and no current would flow.

Polymer electrolyte membranes 10 can be relatively strong, stable substances. These membranes 10 can also be effective gas separators. Although ionic conductors, PEM do not conduct electrons. The organic nature of the structure makes it an electronic insulator. Since the electrons cannot move through the membrane 10, the electrons produced at one side of the cell must travel through an external circuit to the other side of the cell to complete the circuit. It is during this external route that the electrons provide electrical power.

A polymer electrolyte membrane 10 can be a solid, organic polymer, usually poly(perfluorosulfonic) acid. A typical membrane material, Nafion®, consists of three regions:

(1) the Teflon®-like, fluorocarbon backbone, hundreds of repeating —$CF_2$—$CF$—$CF_2$— units in length,
(2) the side chains, —O—$CF_2$—$CF$—O—$CF_2$—$CF_2$—, which connect the molecular backbone to the third region,
(3) the ion clusters consisting of sulfonic acid ions, $SO_3^-$, $H^+$.

The negative ions, $SO_3^-$, are permanently attached to the side chain and cannot move. However, when the membrane 10 becomes hydrated by absorbing water, the hydrogen ions become mobile. Ion movement occurs by protons, bonded to water molecules, migrating from $SO_3^-$ site to $SO_3^-$ site within the membrane. Because of this mechanism, the solid hydrated electrolyte is a good conductor of hydrogen ions.

The catalyst support 52 serves to conduct electrons and protons and to anchor the catalyst 56 (e.g., noble metal). Many efforts have been aimed at lowering the costs of fuel cells by lowering noble metal (e.g., platinum) catalyst 56 levels due to noble metal's cost. One way to lower this cost is to construct the catalyst support layer 52 with the highest possible surface area.

The electrodes 20, 50 of a fuel cell typically consist of carbon 52 onto which very small metal particles 56 are dispersed. The electrode is somewhat porous so that gases can diffuse through each electrode to reach the catalyst 56. Both metal 56 and carbon 52 conduct electrons well, so electrons are able to move freely through the electrode. The small size of the metal particles 56, about 2 nm in diameter for noble metal, results in a large total surface area of metal 56 that is accessible to gas molecules. The total surface area is very large even when the total mass of metal 56 is small. This high dispersion of the catalyst 56 is one factor to generating adequate electron flow (current) in a fuel cell.

Conducting polymers are a class of conjugated double bond polymers whose electrical conductivities are comparable to the conductivities of semiconductors to metals, in the range of 0.1 to 100 S/cm. Typical examples of conducting polymers include polyaniline, polypyrrole, polythiophene, polyfuran, and polyphenylene. Both polyaniline and polypyrrole catalyst support 52 materials have shown improved fuel cell efficiency (e.g., U.S. Pat. No. 5,334,292 and WO 01/15253). However, the long-term stability of these materials has not been demonstrated in electrode environments in cyclic operations.

Conducting polymers alone used as catalyst support 52 material have higher costs, lower surface area, and lower stability compared to those supports 52 based on carbon.

An example of a current commercial carbon-supported catalyst for fuel cells is the HiSPEC™ series of products (Johnson Matthey, Reading, U.K.) which utilize Vulcan® XC72 (Cabot Corporation) carbon black loaded with various levels of platinum (or other metal). These commercial carbon-supported catalysts are very expensive.

Factors such as surface area and electronic conductivity have historically been viewed as important for the carbon support material. However, relatively little research has been undertaken to understand the role of or to optimize the carbon support.

In the present invention, a conducting polymer is grafted onto the surface of a carbonaceous material thereby increasing the electrical conductivity of the carbonaceous material, and the stability of the hybrid material is expected to be enhanced. The polymer grafting process also reduces the porosity of the carbon support, resulting in increased metal availability for electrode reaction.

The majority of the cost associated with electrodes is attributed to the high cost of the metal, which makes up the catalyst 56. Only those catalytic sites exposed on the surface of the catalytic particles contribute to the catalytic activity of the electrode and, thus, electrodes with the highest fraction of the metals accessible to the reaction should be the most effective. Carbon supports 52 with high porosity result in "trapped" metal sites that are not accessible for electrode reaction. The extent of dispersion of the metal catalyst 56 on the support material 52 and the stability of such high dispersion in use, i.e., resistance of the catalyst against sintering and/or agglomeration, is directly related to the surface area and the availability of surface sites on which the dispersed metal 56 can be anchored.

In the present invention, the conducting polymer-grafted carbon material aids the uniform dispersion and stabilization of metal particles by anchoring to hetero atoms, namely, N, O, S, etc., present in the conducting polymer. Also, the hetero atom-containing anchoring groups resist the agglomeration and sintering of metal (e.g., platinum (Pt)) crystallite particles.

It is desirable to provide a catalyst support 52 that has a higher surface area and also a higher surface density of anchoring surface sites than catalytic supports consisting exclusively of carbon. This would increase and stabilize the dispersion of the metal catalyst 56 and, thus, limit the amount of catalyst 56 needed. The present invention provides a PEMFC electrode which can be made more cost-effective than electrodes having exclusively carbon support or exclusively conducting polymer support.

For the above reasons, improvement of the supported catalyst is desired and has been achieved with the present invention.

SUMMARY OF THE INVENTION

In accordance with the purpose(s) of this invention, as embodied and broadly described herein, this invention, in one aspect, relates to conductive polymer-grafted carbons.

The invention includes a composition comprising a particulate carbonaceous material and a conducting polymer containing hetero atoms, wherein the conducting polymer is grafted onto the carbonaceous material.

The invention also includes a method for preparing a carbon with enhanced electronic conductivity comprising oxidatively polymerizing monomer of a conducting polymer containing hetero atoms with particulate carbonaceous material to form a conducting polymer-grafted carbonaceous material.

A device is disclosed comprising a particulate carbonaceous material and a conducting polymer containing hetero atoms, wherein the conducting polymer is grafted onto the carbonaceous material.

A fuel cell comprising an anode, a cathode, and a PEM is further included.

This invention relates to the process of grafting conducting polymers containing hetero atoms onto particulate carbon material (e.g., carbon black, graphite, nanocarbons, fullerenes, finely divided carbon or mixtures thereof) by in situ polymerization and the compositions resulting therefrom. Particularly, the conducting polymers are, for example, polyaniline and polypyrrole. This invention relates to the application of conducting polymer-grafted carbons in fuel cell applications. This invention particularly relates to the application of conducting polymer-grafted carbons as support material in fuel cell catalysts.

In another aspect, the invention relates to a method for preparing a carbon with enhanced electronic conductivity comprising oxidatively polymerizing with an oxidizing agent comprising ozone a monomer of a conducting polymer containing hetero atoms with particulate carbonaceous material to form a conducting polymer-grafted carbonaceous material.

In another aspect, the invention relates to compositions made by this method.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1 shows a "typical" PEMFC.

Anode humidification bottle temperature=105° C., and

Cathode humidification bottle temperature=90° C.

Reactant gases:

Anode hydrogen=60 ml/min+14 ml/min/A

Cathode oxygen=60 ml/min+8 ml/min/A

Backpressure of 30 psi was maintained on the cell during analysis. Potentials depicted were not corrected for iR drop.

Figure 8:
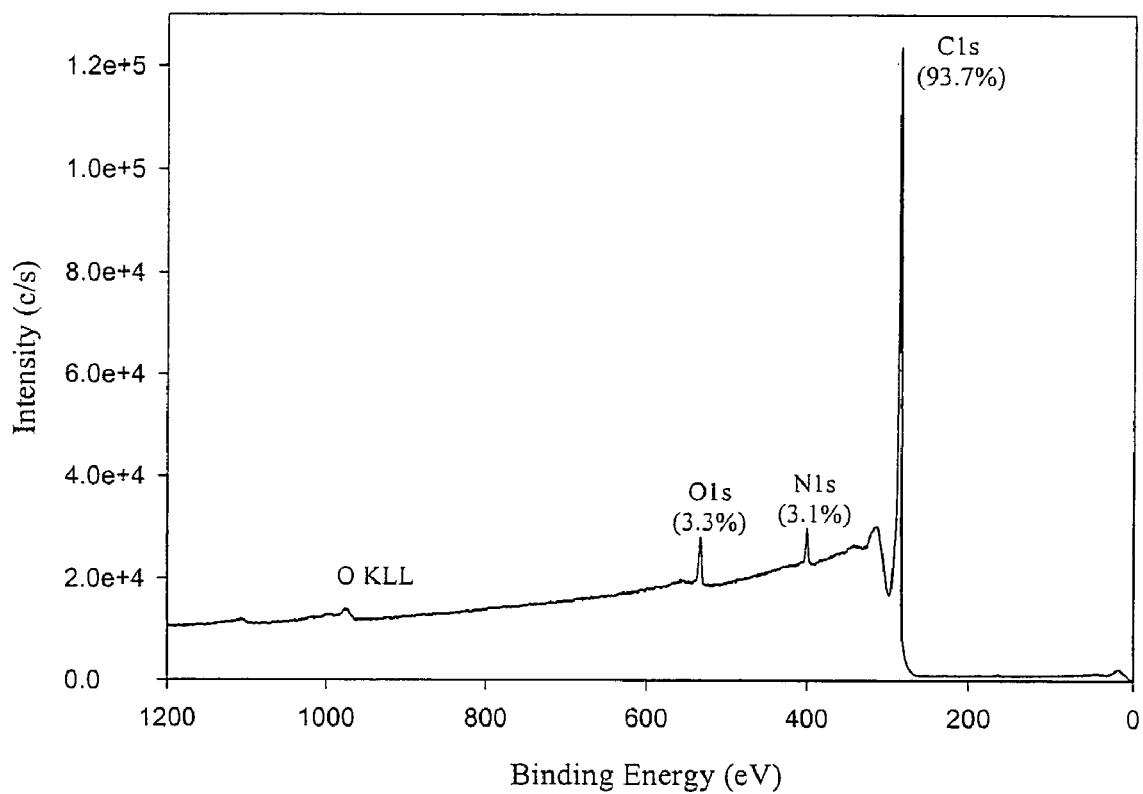

FIG. 8 is an X-ray photoelectron survey spectrum (XPS) of the polyaniline-grafted carbon black of Example 10. This figure shows the presence of the N1s peak which supports that polyaniline has indeed been grafted to the carbon black surface.

Figure 9:
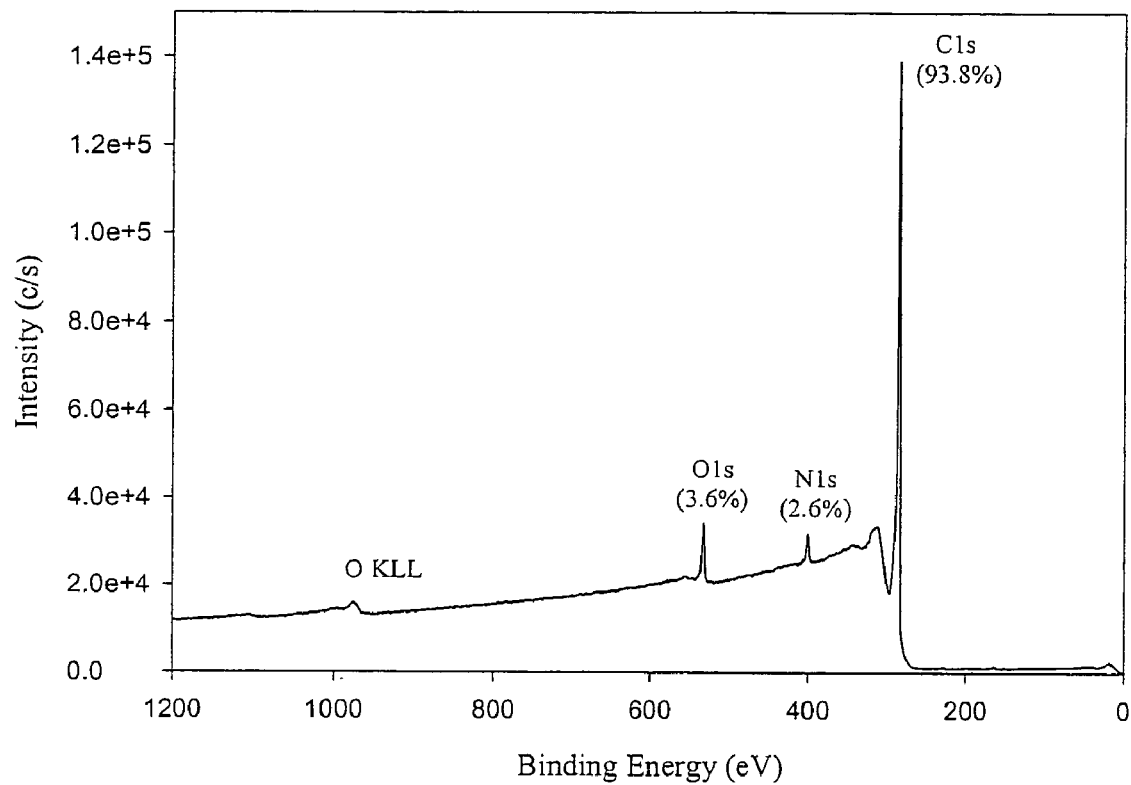

FIG. 9 is an X-ray photoelectron survey spectrum (XPS) of the polypyrrole-grafted carbon black of Example 11. This figure shows the presence of the N1s peak which supports that polypyrrole has indeed been grafted to the carbon black surface.

DESCRIPTION OF THE INVENTION

Before the present compounds, compositions, articles, devices, and/or methods are disclosed and described, it is to be understood that this invention is not limited to specific synthetic methods; specific methods may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

It must be noted that, as used in the specification and the appended claims, the singular forms "a," "an," and "the" include plural referents unless the context clearly dictates otherwise. Thus, for example, reference to "an oxidizing agent" includes mixtures of oxidizing agents, reference to "a reducing agent" includes mixtures of two or more such reducing agents, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

"Optional" or "optionally" means that the subsequently described event or circumstance may or may not occur, and that the description includes instances where said event or circumstance occurs and instances where it does not.

By the term "effective amount" of a composition or property as provided herein is meant such amount as is capable of performing the function of the composition or property for which an effective amount is expressed. As will be pointed out below, the exact amount required will vary from process to process, depending on recognized variables such as the compositions employed and the processing conditions observed. Thus, it is not possible to specify an exact "effective amount." However, an appropriate effective amount may be determined by one of ordinary skill in the art using only routine experimentation.

The term "substituted conducting polymer" is used herein to describe any chemical variation to a conducting polymer that retains the functionalities of conductivity and hetero atoms. For example, poly-3-methyl-aniline is a "substituted" polyaniline.

"Fuel cell" (FC) as used herein is an electrochemical device that converts chemical energy into electrical energy without combustion. Various types of fuel cells include solid oxide (SOFC), molten carbonate (MCFC), alkaline (AFC), phosphoric acid (PAFC), PEM, and direct methanol (DMFC) fuel cells.

A "proton exchange membrane" (PEM), is also known or referred to as polymer electrolyte membrane, solid polymer membrane (SPM), or solid polymer electrolyte (SPE) in the fuel cell art. A PEMFC is a type of fuel cell that utilizes a polymer electrolyte membrane to carry protons between two catalytic electrode layers, thus generating electrical current. A PEM typically operates at temperatures up to 100° C.

"Membrane electrode assembly" (MEA) is a term used for an assembly which normally comprises a polymer membrane with affixed/adjacent electrode layers. In some cases the MEA may also include gas diffusion layer/materials.

"Metal" as used herein can be, e.g., a precious metal, noble metal, platinum group metals, platinum, alloys and oxides of same, and compositions that include transition metals and oxides of same. As used herein, it is a "metal" that acts as a catalyst for the reactions occurring in the fuel cell. The metal may be tolerant of CO contaminants and may also be used in direct methanol fuel cells.

"Ionomer," is an ionically conductive polymer (e.g., Nafion®). An ionomer is also frequently used in the electrode layer to improve ionic conductivity.

"Membrane," can be known as polymer electrolyte membrane, solid polymer electrolyte, proton exchange membrane, separator, or polymer membrane. The "membrane" is an ionically conductive, dielectric material against which catalytic electrodes are placed or affixed. Typically currently in the art, the membrane most frequently used is a perfluorosulfonated polymer (e.g., Nafion®), which can be obtained in varying thicknesses, equivalent weights, etc.

"Electrolyte" as used herein is a nonmetallic electric conductor in which current is carried by the movement of ions or a substance that when dissolved in a suitable solvent becomes an ionic conductor. The polymer membrane of a fuel cell is the electrolyte.

"Electrocatalyst," also referred to as a "catalyst," is a metal (as defined above) which is catalytic for fuel cell reactions, typically supported on a catalyst support (defined below).

"Supported catalyst" is a metal (as defined above) dispersed on a support.

"Catalyst support" is a material upon which metal (as defined above) is dispersed, typically conductive (e.g., carbon black, conducting polymer, or modified carbon black).

"Electrode," as used herein, is the layer of supported electrocatalyst in contact with and/or affixed to a membrane. The electrode may include ionomer and other materials in addition to the electrocatalyst.

"Oxygen reduction reaction," also known as ORR, cathode reaction, or cathodic process, is a reaction in which oxygen gas is reduced in the presence of protons, producing water.

"Hydrogen oxidation reaction" is also known as HOR, anode reaction, or anodic process. This is a reaction in which hydrogen gas is converted into protons and electrons.

"Protons," sometimes referred to in a the fuel cell context as $H^+$, hydrogen ions, or positive ions, are a positively charged portion of hydrogen atom which results from reaction over catalyst material.

"Anode" is the electrode where fuel oxidation reaction occurs.

"Cathode" is the electrode where oxidant reduction reaction occurs.

"Gas diffusion layer," or GDL or porous backing layer, is a layer adjacent to the electrodes which aides in diffusion of gaseous reactants across the electrode surface; it is typically a carbon cloth or carbon-based/carbon-containing paper (e.g., one manufactured by Toray). The GDL should be electrically conductive to carry electrons through an external circuit.

"Current collector" is the portion of a fuel cell adjacent to the GDL through which electrons pass to an external circuit; it may also contain channels or paths (flow field) to assist in gas distribution and is typically made of graphite or conductive composites.

"Flow field" is the scheme for distributing gaseous reactants across the electrode. A flow field may be part of a current collector and/or a GDL.

"Insulator," or dielectric, is a material which is not electrically conductive.

"Electrical conductivity," or electronic conductivity, is the ability of a material to conduct electrons.

"Protonic conductivity" or ionic conductivity (IC), is the ability of a material to conduct ions or protons.

"Platinization" or more generically, "metallization," is a process of depositing or precipitating metal (as defined above) onto the surface of a catalyst support. Specifically, platinization is a process of depositing or precipitating platinum (Pt) onto the surface of a catalyst support.

"Carbon black" is a conductive acinoform carbon utilized, for example, as a catalyst support (defined above).

"Porosity," or permeability, can be used to refer to porosity of carbon black (i.e., difference in NSA and STSA surface area measurements), or to macroscopic porosity of an electrode structure (i.e., related to ability of diffusion of gaseous reactants through an electrode layer).

"Carbonaceous" refers to a solid material comprised substantially of elemental carbon. "Carbonaceous material" is intended to include, without limitation, i) carbonaceous compounds having a single definable structure; or ii) aggregates of carbonaceous particles, wherein the aggregate does not necessarily have a unitary, repeating, and/or definable structure or degree of aggregation.

"Particulate" means a material of separate particles.

"Polarization curve," IV curve, or current-voltage curve, is the data/results from electrochemical analysis of MEAs or catalyst materials.

"PANI," or polyaniline, is an electrically conductive polymer.

"PPY," or polypyrrole, is an electrically conductive polymer.

"X-ray diffraction" (XRD) is an analysis method for determining crystallographic properties of a material, specifically as used herein the size of dispersed metal particles.

"X-ray photoelectron spectroscopy" (XPS), or electron scanning chemical analysis (ESCA), is an analysis method for obtaining chemical state information on materials.

"CO chemisorption," or more simply, CO, is an analysis method for determining the available surface area of a material, specifically metal particles.

The present invention provides a method of grafting conducting polymers, specifically conducting polymers containing hetero atoms, on a particulate carbon substrate and the resulting composition. The conducting polymer-grafted carbon serves as unique catalyst support to increase the electronic conductivity and uniform distribution of metal particles in fuel cell supported catalysts.

Composition

The invention includes a composition comprising a particulate carbonaceous material (substrate), and a conducting polymer containing hetero atoms, wherein the conducting polymer is grafted onto the surface of the carbonaceous material. The composition can further comprise a metal.

The carbonaceous material is described below. The carbonaceous material can be less than about 98% by weight of the composition of the present invention, for example, about 2, 5, 10, 15, 20, 25, 30, 35, 40, 45, 50, 55, 60, 65, 70, 75, 80, 85, 90, 95, 96, or 97%. The carbonaceous material can be about 1% to about 90% by weight of the composition, for example, about 2, 5, 10, 12, 15, 17, 20, 22, 25, 27, 30, 32, 35, 37, 40, 42, 45, 47, 50, 52, 55, 57, 60, 62, 65, 67, 70, 72, 75, 77, 80, 82, 85, 87, or 88%. The carbonaceous material can be about 40% to about 90% by weight of the composition, for example, about 41, 44, 46, 50, 51, 54, 56, 60, 61, 64, 66, 70, 71, 74, 76, 80, 81, 84, 86, or 89%. The carbonaceous material can be about 50% to about 80% by weight of the composition, for example, about 53, 54, 55, 57, 58, 60, 63, 65, 67, 68, 70, 73, 75, 77, 78, or 79%, of the present invention.

The conducting polymer is described below. The conducting polymer can be greater than about 0% and less than about 100% by weight of the composition of the present invention, for example, about 1, 2, 5, 10, 15, 20, 25, 30, 35, 40, 45, 50, 55, 60, 65, 70, 75, 80, 85, 90, 95, 96, 97, 98, or 99%. The conducting polymer can be about 1% to about 50% by weight, for example, 2, 5, 7, 10, 12, 15, 17, 20, 22, 25, 27, 30, 32, 35, 37, 40, 42, 45, 47, 48, or 49%. The conducting polymer can be about 20% to about 50% by weight, for example, about 22, 24, 25, 30, 35, 40, 45, 47, or 48%, of the composition of the present invention.

The conducting polymer contains hetero atoms which are also described below.

The conducting polymer containing hetero atoms is grafted onto the surface of the carbonaceous material. The conducting polymer can be grafted to the carbonaceous material, for example, by a method described below. The conducting polymers can be formed and grafted to the carbonaceous material, for example, by oxidatively polymerizing a monomer of the conducting polymer with the carbonaceous material.

The composition can further comprise a metal. The metal is described below. The metal can be about 2% to about 80% of the composition, for example, about 3, 5, 7, 8, 10, 12, 13, 15, 17, 20, 22, 25, 27, 30, 32, 35, 37, 40, 42, 45, 47, 50, 52, 55, 57, 60, 62, 65, 67, 70, 72, 75, or 78%. The metal can be about 2% to about 60% of the composition, for example, about 5, 7, 10, 12, 15, 20, 25, 30, 35, 40, 45, 50, 55, or 57%. The metal can be about 20% to about 40% of the composition for example, about 22, 25, 30, 35, or 38%. The metal can be uniformly distributed "through" the composition, i.e., on the surface of the composition or in the conducting polymer of the composition.

Carbonaceous Material

The carbonaceous material can be any particulate, substantially carbonaceous material that is an electronically conductive carbon and has a "reasonably high" surface area. For example, carbon black, graphite, nanocarbons, fullerenes, fullerenic material, finely divided carbon, or mixtures thereof can be used.

Carbon Black

The carbonaceous material can be carbon black. The choice of carbon black in the invention is not critical. Any carbon black can be used in the invention. Carbon blacks with surface areas (nitrogen surface area, NSA) of about 200 to about 1000 $m^2/g$, for example, 200, 220, 240, 250, 300, 350, 400, 450, 500, 550, 600, 650, 700, 750, 800, 850, or 950 $m^2/g$ can be used. Specifically, a carbon black with a surface area of 240 $m^2/g$ (NSA, ASTM D6556) can be used. It is preferred that the carbon black have fineness effective for metal dispersion. It is preferred that the carbon black have structure effective for gas diffusion.

The carbon black can be less than about 98% by weight of the composition of the present invention, for example, about 2, 5, 10, 15, 20, 25, 30, 35, 40, 45, 50, 55, 60, 65, 70, 75, 80, 85, 90, 95, 96, or 97%. The carbon black can be about 1% to about 90% by weight of the composition, for example, about 2, 5, 10, 12, 15, 17, 20, 22, 25, 27, 30, 32, 35, 37, 40, 42, 45, 47, 50, 52, 55, 57, 60, 62, 65, 67, 70, 72, 75, 77, 80, 82, 85, 87, or 88%. The carbon black can be about 40% to about 90% by weight of the composition, for example, about 41, 44, 46, 50, 51, 54, 56, 60, 61, 64, 66, 70, 71, 74, 76, 80, 81, 84, 86, or 89%. The carbon black can be about 50% to about 80% by weight of the composition, for example, about 53, 54, 55, 57, 58, 60, 63, 65, 67, 68, 70, 73, 75, 77, 78, or 79%, of the present invention.

Those skilled in the art will appreciate that carbon black particles have physical and electrical conductivity properties which are primarily determined by the particle and aggregate size, aggregate shape, degree of graphitic order, and surface chemistry of the particle.

Also, the conductivity of highly crystalline or highly graphitic particles is higher than the conductivity of more amorphous particles. Generally, any of the forms of carbon black particles is suitable in the practice of the present invention and the particular choice of size, structure, and degree of graphitic order depends upon the physical and conductivity requirements of the carbon black.

One of skill in the art could readily choose an appropriate carbon black for a particular application.

Carbon blacks are commercially available (e.g., Columbian Chemical Company, Atlanta, Ga.).

Other Carbonaceous Material

The particulate carbonaceous material can be a material other than carbon black. The choice of other carbonaceous material in the invention is not critical. Any substantially carbonaceous material that is an electronically conductive carbon and has a "reasonably high" surface area can be used in the invention. For example, graphite, nanocarbons, fullerenes, fullerenic material, finely divided carbon, or mixtures thereof can be used.

It is preferred that the carbonaceous material have fineness effective for metal dispersion. It is preferred that the carbonaceous material have structure effective for gas diffusion.

One of skill in the art could readily choose a carbonaceous material for a particular application.

These carbonaceous materials are commercially available.

The carbonaceous material can be less than about 98% by weight of the composition of the present invention, for example, about 2, 5, 10, 15, 20, 25, 30, 35, 40, 45, 50, 55, 60, 65, 70, 75, 80, 85, 90, 95, 96, or 97%. The carbonaceous material can be about 1% to about 90% by weight of the composition, for example, about 2, 5, 10, 12, 15, 17, 20, 22, 25, 27, 30, 32, 35, 37, 40, 42, 45, 47, 50, 52, 55, 57, 60, 62, 65, 67, 70, 72, 75, 77, 80, 82, 85, 87, or 88%. The carbonaceous material can be about 40% to about 90% by weight of the composition, for example, about 41, 44, 46, 50, 51, 54, 56, 60, 61, 64, 66, 70, 71, 74, 76, 80, 81, 84, 86, or 89%. The carbonaceous material can be about 50% to about 80% by weight of the composition, for example, about 53, 54, 55, 57, 58, 60, 63, 65, 67, 68, 70, 73, 75, 77, 78, or 79%, of the present invention.

Conducting Polymer

The conductive material used in the invention is any conductive material which is effective for the discussed purposes of the invention. Specifically, the conductive material can be a conducting polymer. The conducting polymer can be any organic polymer capable of electronic conductivity attributable to extended conjugated/delocalized multiple bonds and containing unshared electron pairs as provided by the presence of hetero atoms.

Polyaniline, polypyrrole, polythiophene, polyfuran, poly (p-phenylene-oxide), poly(p-phenylene-sulfide), substituted conducting polymers, or mixtures thereof can be used. Specifically, the conducting polymer can include polyaniline, polypyrrole, polyfuran, polythiophene, or mixtures thereof. Mixtures of these polymers can include physical mixtures as well as copolymers of the monomers of the respective polymers. As used herein, reference to a polymer also covers a copolymer. More specifically, the conducting polymer can comprise polyaniline or polypyrrole.

The conducting polymer is grafted to the carbonaceous material surface in a process such as oxidative polymerization. The monomer(s) of the desired resulting conducting polymer is polymerized in the presence of the carbonaceous material, thus grafting the polymer to the carbonaceous material. A method for making this is described below.

The presence of polymers in the final composition is supported by XPS results and by the observed physical properties (e.g., ability to press films from the composition).

One of skill in the art could readily choose a conductive material (e.g., conducting polymer) for a particular application. Conducting polymers are commercially available and are readily prepared by a person of ordinary skill in the art.

The conducting polymer contains hetero atoms. The hetero atoms can be N, S, and O, for example. The amount of hetero atoms in weight % of the resulting polymer is the same weight % as the hetero atoms in the monomer(s) used for the polymer (e.g., 15% N for aniline/polyaniline and 21% N for pyrrole/polypyrrole). The location of the hetero atoms in the conducting polymer also depends on the corresponding monomer(s).

One of skill in the art could readily choose which hetero atoms to have in a particular conducting polymer for a particular application. Conducting polymers with hetero atoms are commercially available and are readily prepared by a person of ordinary skill in the art.

The conducting polymer with hetero atoms is grafted onto the carbon black surface, for example, thereby increasing the electrical conductivity of the carbonaceous material and the stability of the hybrid (i.e., polymer+carbon) material is expected to be enhanced. The polymer grafting process also reduces the porosity of the carbon black.

The grafting process is described below.

The hetero atom containing conductive polymer-grafted carbon material also shows hydrophilic character and thereby enhances the humidification process when used in a fuel cell application, for example. Also, the higher conductivity of these polymers facilitates the electron transfer process.

The conducting polymer can be greater than about 0% and less than about 100% by weight of the composition of the present invention, for example, about 1, 2, 5, 10, 15, 20, 25, 30, 35, 40, 45, 50, 55, 60, 65, 70, 75, 80, 85, 90, 95, 96, 97, 98, or 99%. The conducting polymer can be about 1% to about 50% by weight, for example, 2, 5, 7, 10, 12, 15, 17, 20, 22, 25, 27, 30, 32, 35, 37, 40, 42, 45, 47, 48, or 49%. The conducting polymer can be about 20% to about 50% by weight, for example, about 22, 24, 25, 30, 35, 40, 45, 47, or 48%, of the composition of the present invention.

The grafted conducting polymer (with hetero atoms) grafted on carbonaceous material behaves differently, when used as a catalyst support, than the carbonaceous material alone or the conducting polymer alone.

Catalyst Support

A composition of the present invention can be utilized as a catalyst support. A catalyst support of the present invention comprises a carbonaceous material and a conductive material (e.g., a conducting polymer containing hetero atoms). The conductive material is grafted to the carbonaceous material thus forming a single material rather than merely a mixture.

The catalyst support comprises the conducting polymer-grafted carbonaceous material. The amount of each component is described above.

The method for making the catalyst support is described below.

Example 8 below demonstrates the increase in electronic conductivity for the catalyst supports of the present invention over carbon alone.

Metal/Catalyst

A composition of the present invention can further comprise a metal. The metal can be, for example, platinum, iridium, osmium, rhenium, ruthenium, rhodium, palladium, vanadium, chromium, or a mixture thereof, or an alloy thereof, specifically, the metal can be platinum.

As defined above, the metal can also be alloys or oxides of metals effective as catalysts.

It is desired that the form and/or size of the metal provide the highest surface area of the metal possible per unit mass. It is desired that the size of the metal particles be kept as small as possible to achieve this end. Generally, in the art, metal particles end up as approximately 2 to about 6 nm during use in fuel cells due to sintering. A size less than about 2 nm can provide better performance. Atomic platinum, for example, would be ideal and found in groups of about 3 atoms.

The amount of metal can be any amount. The amount of metal can be an effective catalytic amount. One of skill in the art can determine an amount effective for the desired performance.

The metal can be about 2% to about 80% of the composition, for example, about 3, 5, 7, 8, 10, 12, 13, 15, 17, 20, 22, 25, 27, 30, 32, 35, 37, 40, 42, 45, 47, 50, 52, 55, 57, 60, 62, 65, 67, 70, 72, 75, or 78%. The metal can be about 2% to about 60% of the composition, for example, about 5, 7, 10, 12, 15, 20, 25, 30, 35, 40, 45, 50, 55, or 57%. The metal can be about 20% to about 40% of the composition for example, about 22, 25, 30, 35, or 38%. The metal can be uniformly distributed "through" the composition, i.e., on the surface of the composition or in the conducting polymer of the composition.

One of skill in the art could readily choose which metal to use in the composition for a particular application. Metals are commercially available.

Supported Catalyst/Electrode

The catalyst support above can further comprise a metal. This resulting composition can be a supported catalyst (or electrode), such as in a fuel cell.

The catalyst support and metal are described above. The metal can be uniformly distributed "through" the catalyst support.

The supported catalyst can be made by methods described below. For example, the supported catalyst can be made by grafting a conducting polymer containing hetero atoms to a particulate carbonaceous material and then adding the metal. More specifically, the conducting polymer containing hetero atoms can be formed and grafted to carbonaceous material (e.g., carbon black) by oxidative polymerization of the monomer of the conducting polymer in the presence of the carbonaceous material and then subsequently metallized (e.g., platinized).

The supported catalyst can be used in various applications requiring such a supported catalyst. One example of such an application is in a fuel cell, specifically as an electrode in a fuel cell.

Factors such as surface area and conductivity of the supported catalyst have historically been viewed as important. Relatively little research has been undertaken until the present invention to understand the role of and optimize the carbon support portion.

In the present invention, the conducting polymer-grafted carbon black aids the uniform dispersion of metal such as by anchoring the metal to the hetero atoms present in the conducting polymer. Also, the hetero atom-containing anchoring groups facilitate prevention of agglomeration and sintering of platinum (Pt) (or other metal) particles.

The conducting polymer is grafted on the carbon black surface, for example, thereby increasing the electrical conductivity of the carbonaceous material and the stability of the hybrid material is expected to be enhanced. The reduction in available porosity of the carbon black due to the polymer grafting process results in increased metal accessability for the electrode reaction.

The current standard in the industry for carbon-supported catalysts in fuel cells is the Johnson Matthey HiSPEC™ series typically loaded with about 10-40% or 10-60% platinum.

Example 9 below shows a comparison of the dispersion of Pt on carbon black in the supported catalysts of the present invention relative to a HiSPEC™ supported catalyst.

Device

The invention includes various devices.

Electrode

An electrode of the present invention is described above. An electrode of the invention can serve as either an anode, a cathode, or both.

Membrane Electrode Assembly (MEA)

The combination of anode/membrane/cathode (electrode/electrolyte/electrode) in a fuel cell is referred to as the membrane/electrode assembly (MEA). The evolution of MEA in PEM fuel cells has passed through several generations. The original membrane/electrode assemblies were constructed in the 1960s for the Gemini space program and used 4 mg $Pt/cm^2$ of membrane area, which generated about 0.5 amperes per mg Pt. Current technology varies with the manufacturer, but total Pt loading has decreased from the original 4 $mg/cm^2$ to about 0.5 $mg/cm^2$. Laboratory research now uses Pt loadings of 0.15 $mg/cm^2$ which are able to generate about 15 amperes per mg Pt.

Membrane/electrode assembly construction varies greatly, but the following is one of the typical procedures. The supported catalyst/electrode material is first prepared in liquid "ink" form by thoroughly mixing together appropriate amounts of supported catalyst (powder of metal, e.g., Pt, dispersed on carbon) and a solution of the membrane material (ionomer) dissolved in a solvent, e.g., alcohols. Once the "ink" is prepared, it is applied to the surface of the solid membrane, e.g., Nafion®, in a number of different ways. The simplest method involves painting the catalyst "ink" directly onto a dry, solid piece of membrane. The wet supported catalyst layer and the membrane are heated until the catalyst layer is dry. The membrane is then turned over and the procedure is repeated on the other side. Supported catalyst layers are then on both sides of the membrane. The dry membrane/electrode assembly is next rehydrated by immersing in dilute acid solution to also ensure that the membrane is in the $H^+$ form needed for fuel cell operation. The final step is the thorough rinsing in distilled water. The membrane/electrode assembly is then ready for insertion into the fuel cell hardware.

The membrane/electrode assembly can have a total thickness of about 200 μm, for example, and conventionally generate more than 0.5 an ampere of current for every square cm of membrane/electrode assembly at a voltage between the cathode and anode of 0.7 V, when encased within well-engineered components.

Supported Catalyst/Electrode

The supported catalyst/electrode of the present invention is described above.

The supported catalyst/electrode can be applied to the membrane of the MEA which is described below. For example, the supported catalyst can be added to a solvent and "painted" onto the membrane. One of skill in the art could easily determine methods for applying the supported catalyst to the membrane.

Transfer Membrane/Electrolyte

The PEM carries the necessary protons from the anode to the cathode while keeping the gases safely separate.

The thickness of the membrane in a membrane/electrode assembly can vary with the type of membrane. The thickness of the supported catalyst layers depends on how much metal is used in each electrode. For example, for supported catalyst layers containing about 0.15 mg Pt/cm$^2$, the thickness of the supported catalyst layer can be close to 10 μm. The thickness of the supported catalyst layer can be, for example, about 0.1 to about 50 μm, more specifically on the order of about 20 to about 30 μm. Thicknesses above 50 μm appear to increase the mass transfer problems too much to be effective. An appropriate thickness of supported catalyst can be determined by one of skill in the art.

The membrane of the MEA can be a dielectric, ionically-conductive material. It is desired that the membrane be sufficiently durable to withstand conditions within a fuel cell. An appropriate membrane can be determined by one of skill in the art.

The membrane of the MEA can be an ionomer, specifically a perfluorosulfonate ionomer. More specifically, the membrane can be a poly(tetrafluoroethylene)-based cation exchange ionomer such as Nafion® (DuPont, Wilmington, Del.; Fayetteville, N.C.). Nafion® is a perfluorinated polymer that contains small proportions of sulfonic or carboxylic ionic functional groups. Its general chemical structure can be seen below, where X is either a sulfonic or carboxylic functional group and M is either a metal cation in the neutralized form or an H$^+$ in the acid form.

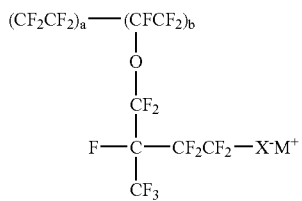

The MEA comprises an anode, a cathode, and a membrane.

The anode can be an electrode of the present invention. The electrode should be electrically conducting, porous enough to let reactants diffuse to the metal, and able to carry protons to the membrane. The cathode can also be an electrode of the present invention.

Figure 7:
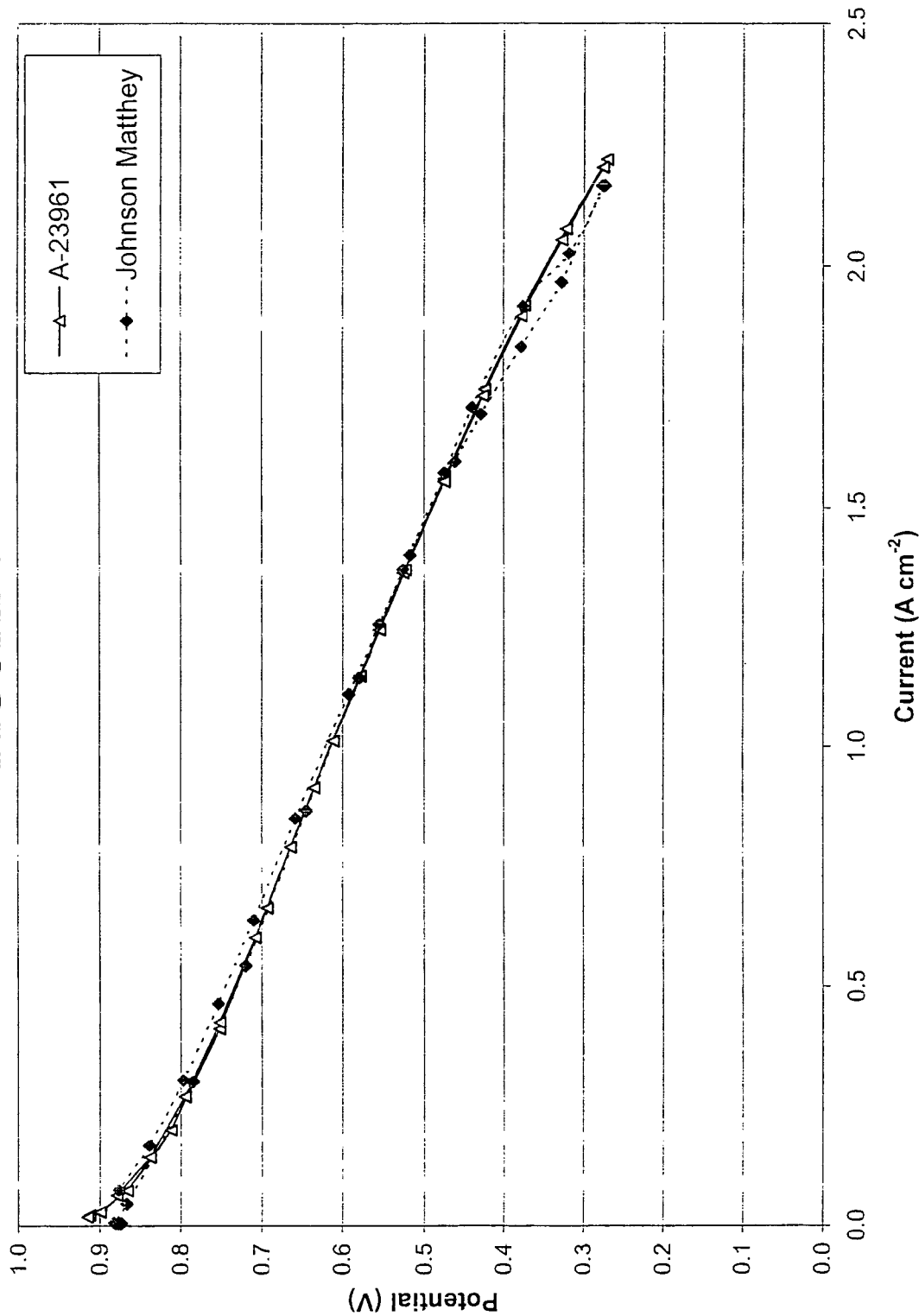
FIG. 7 is a graph of MEA polarization curves comparing the commercial Johnson Matthey product and a platinized polyaniline-grafted carbon black of the present invention demonstrating the performance of the two materials in membrane electrode assemblies. The potential was varied across the materials and the current was measured. Electrode was prepared via the "decal transfer" method developed by Los Alamos Laboratory. For each sample, both anode and cathode were prepared to an approx Pt loading of 0.3 mg/cm$^2$. Analysis conditions were Cell temperature=80° C.

FIG. 7 demonstrates the functionality of MEAs of the present invention.

Fuel Cell

A fuel cell comprises an MEA, fuel feed, and oxidant feed. A fuel cell typically comprises an MEA, backing layers, and flow fields/current collectors, fuel feed, and oxidant feed.

MEA

An MEA is described above.

Backing Layers

The hardware of the fuel cell can include backing layers. The layers are generally one next to the anode and another next to the cathode and made of a porous carbon paper or carbon cloth. They layers are made of a material that can conduct the electrons exiting the anode and entering the cathode.

Backing layers are commercially available or can be prepared by one of skill in the art. Appropriate backing layers can be chosen by one of skill in the art.

Flow Fields/Current Collectors

The hardware of the fuel cell can include flow fields and current collectors. Pressed against the outer surface of each backing layer can be a piece of hardware, called a bipolar plate, which often serves the dual role of flow field and current collector. The plates are generally made of a lightweight, strong, gas impermeable, electron-conducting material; graphite, metals, or composite plates are commonly used.

The bipolar plates can provide a gas flow field such as channels machined into the plate. The channels carry the reactant gas from the point at which it enters the fuel cell to the point at which the gas exits. The pattern, width, and depth have a large impact on the effectiveness of the distribution of the gases evenly across the active area of the membrane/electrode assembly. The flow field also affects water supply to the membrane and water removal from the cathode.

The bipolar plates can also serve as current collectors. Electrons produced by the oxidation of hydrogen can be conducted through the anode, through the backing layer and through the plate before they can exit the cell, travel through an external circuit and re-enter the cell at the cathode plate.

Flow fields and current collectors are commercially available or can be prepared by one of skill in the art. Appropriate flow fields and current collectors can be chosen by one of skill in the art.

The devices and methods of the present invention are useful in preparing and using fuel cells. Other applications can include electrodes and bipolar plates (or current collector plates) in energy conversion devices (such as fuel cells, batteries, or capacitors) when the current modified carbon products are used in combination with other materials.

Method

Oxidative Polymerization

A method of the present invention comprises contacting a monomer of a conducting polymer containing hetero atoms and a particulate carbonaceous material in the presence of an oxidizing agent, thus effectively concurrently polymerizing the monomer and grafting the resultant polymer to the carbonaceous material.

The contacting can, but need not, take place in a liquid phase.

Any method which facilitates oxidative polymerization can be used. One of skill in the art can determine a method to graft the conducting polymer (polymerize the monomer) to the carbonaceous material which maintains the purposes and characteristics of the invention.

Examples of this reaction scheme/method include the following:

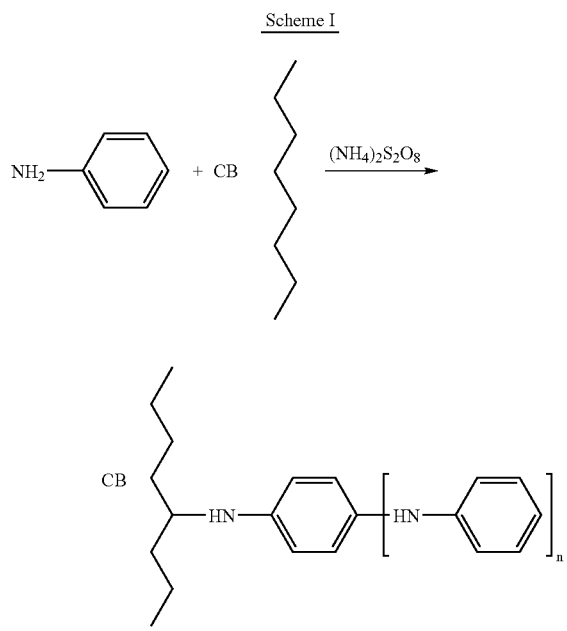

Scheme I

Scheme II

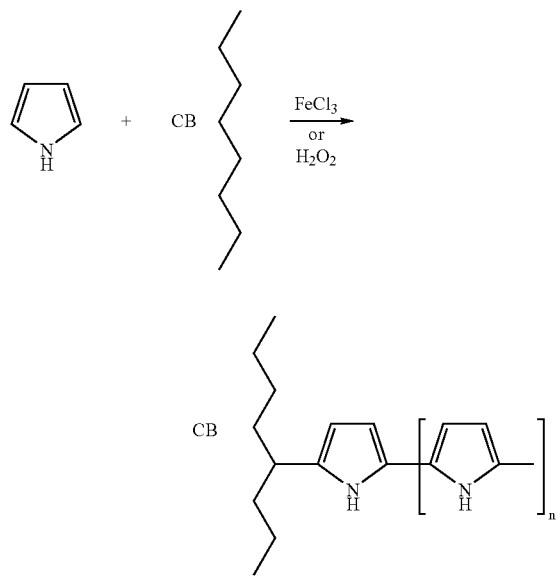

Scheme III

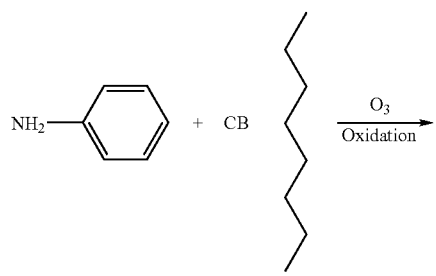

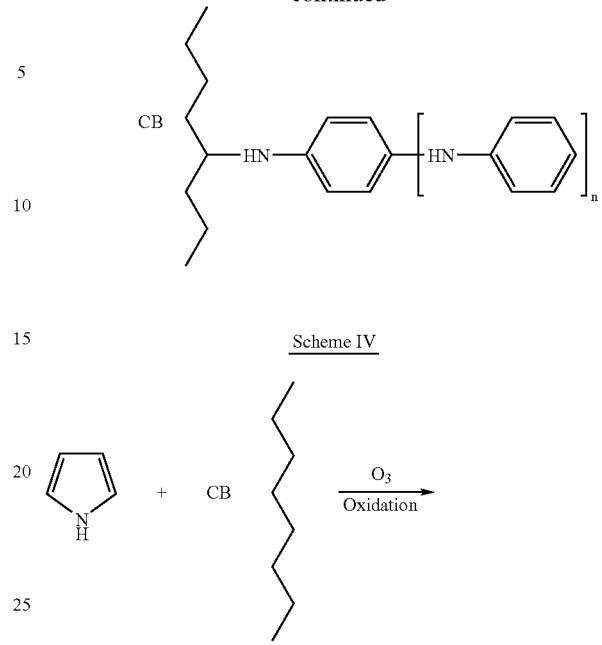

Scheme IV

The oxidizing agent can be added in stoichiometic amount/molar equivalent to the amount of monomer. Alternatively the oxidizing agent can be in stoichiometic excess relative to the monomer. For example, a 1:1 mole ratio of monomer to oxidant was used for Examples 1-3 below, whereas excess oxidant was employed in Examples 10 and 11.

The reaction can be carried out at room temperature and pressure. Specific examples of the reaction are given in the Examples below. The reaction can be carried out, for example, at temperatures up to about 70° C.

Specific examples of this method are described below in Examples 1-3 and 10-11.

An aqueous slurry of carbonaceous material can be used. Slightly acidic conditions, such as a pH of about 4 to about 5 can be used. Reaction time of about 2 hours, for example, can be used.

Carbonaceous Material

The particulate carbonaceous material is described above in detail under the COMPOSITION section.

Conducting Polymer

The conducting polymer containing hetero atoms and corresponding monomer are described above in detail under the COMPOSITION section.

Oxidizing Agent

The reaction can be carried out in the presence of an oxidizing agent. An oxidizing agent is used to create sufficiently oxidizing conditions to facilitate polymerization of the monomer. Various oxidizing agents are known in the art. These oxidizing agents are readily commercially available or readily synthesized by methods known to one of skill in the art.

Choice of appropriate oxidizing agent is readily determined by one of skill in the art for the desired application.

Examples of oxidizing agents that can be used include ammonium persulfate, ferric chloride, hydrogen peroxide, potassium, permanganate, potassium chlorate, chloroplatinic acid, or a combination of oxidizing agents. Another oxidizing agent that can be used includes ozone or a combination of ozone and another oxidizing agent. Typically ozone is delivered in a mixture with dry air as pure ozone is relatively unstable. Therefore, as used herein, the oxidative polymerization with ozone intends both pure ozone as well as ozone mixed with other gasses, such as air. Typical concentrations of ozone in air are from 1 to 4 vol %. The reaction is typically at atmospheric pressure.

Some monomers require a stronger oxidizing agent than others.

The amount of oxidizing agent can be stoichiometric to the monomer or in excess relative to monomer, rather than being used in catalytic amounts.

One of skill in the art would be able to determine conditions, amount, and choice of oxidizing agent for a particular application.

Addition of Metal/Metallizing

Metal can be added to the polymer-grafted carbonaceous material subsequent to its preparation. The metal can be added by metallizing. For example, if the metal is platinum, one method of platinization is described below.

One of skill in the art would be able to determine choice of metallizing method for a particular application. Various metallizing agents are known in the art. These metallizing agents are readily commercially available or readily synthesized by methods known to one of skill in the art.

The amount of metallizing agent is readily determined by one of skill in the art for a desired application.

Platinizing

A platinizing agent can be used to add platinum to the grafted carbonaceous material. Various platinizing agents are known in the art. These platinizing agents are readily commercially available or readily synthesized by methods know to one of skill in the art.

Choice of appropriate platinizing agent is readily determined by one of skill in the art for the desired application. Generally, anything containing the desired metal can be used, for example, any salt or organo-compound containing the metal.

Examples of platinizing agents that can be used include platinum salts: chloroplatinic acid, platinum nitrate, platinum halides, platinum cyanide, platinum sulfide, organoplatinum salts, or a combination thereof.

The amount of platinizing agent is readily determined by one of skill in the art for a desired application.

Reducing Agent

A reducing agent can be used to reduce the metal to metallic form. Various reducing agents are known in the art. These reducing agents are readily commercially available or readily synthesized by methods known to one of skill in the art.

The amount of reducing agent for the current method is always in excess of stoichiometric.

Choice of appropriate reducing agent is readily determined by one of skill in the art for the desired application.

Examples of reducing agents that can be used include formaldehyde, formic acid, sodium borohydride, hydrogen, hydrazine, hydroxyl amine, or a combination of reducing agents.

EXAMPLES

The following examples are put forth so as to provide those of ordinary skill in the art with a complete disclosure and description of how the compounds, compositions, articles, devices, and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric.

Example 1

Preparation of Polyaniline-grafted Carbon Black

A slurry was made using 100 g CDX-975 carbon black (NSA surface area 240 $m^2/g$ and oil absorption of 170 ml/100 g) (Columbian Chemical Company, Atlanta, Ga.) and 25 ml glacial acetic acid in 750 ml deionized (DI) water.

| CDX-975 "typical" properties | |
|---|---|
| Property | Value |
| Mean particle size (nm) ASTM D3849 | 21 |
| NSA surface area ($m^2/g$) ASTM D4820 | 242 |
| STSA surface area ($m^2/g$) ASTM D5816 | 130 |
| DBPA oil absorption (cc/100 g) Beads ASTM D2414 | 169 |
| DBPA oil absorption (cc/100 g) Powder ASTM D2414 | — |
| % volatile | 1.0 |
| Blackness index | 112 |
| Tint strength ASTM D3265 | 87 |

20 g aniline (Aldrich, 98% purity) was added to the slurry with continuous stirring.

Figure 1A:
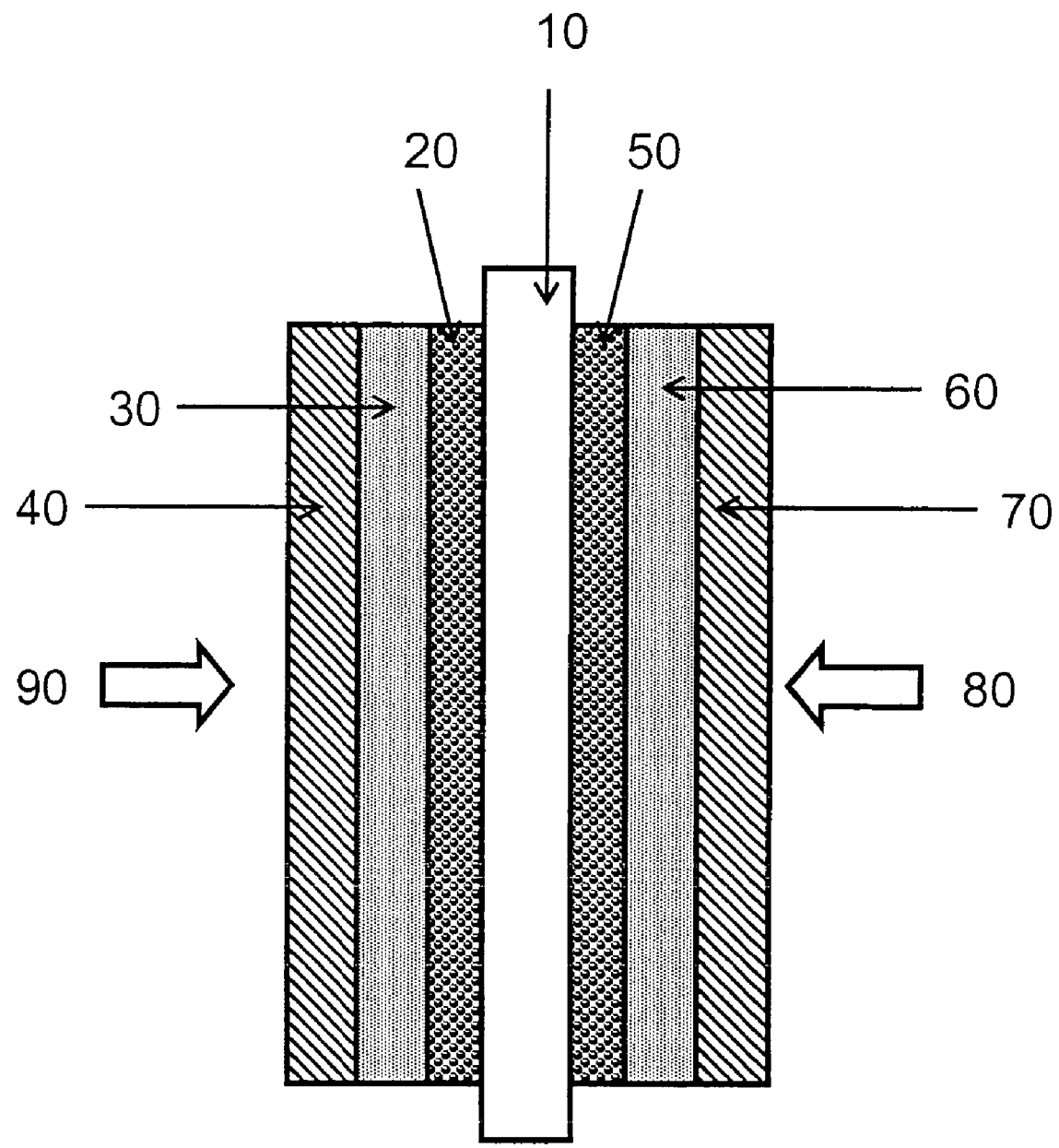
FIG. 1A shows a schematic drawing of PEMFC.
Figure 1B:
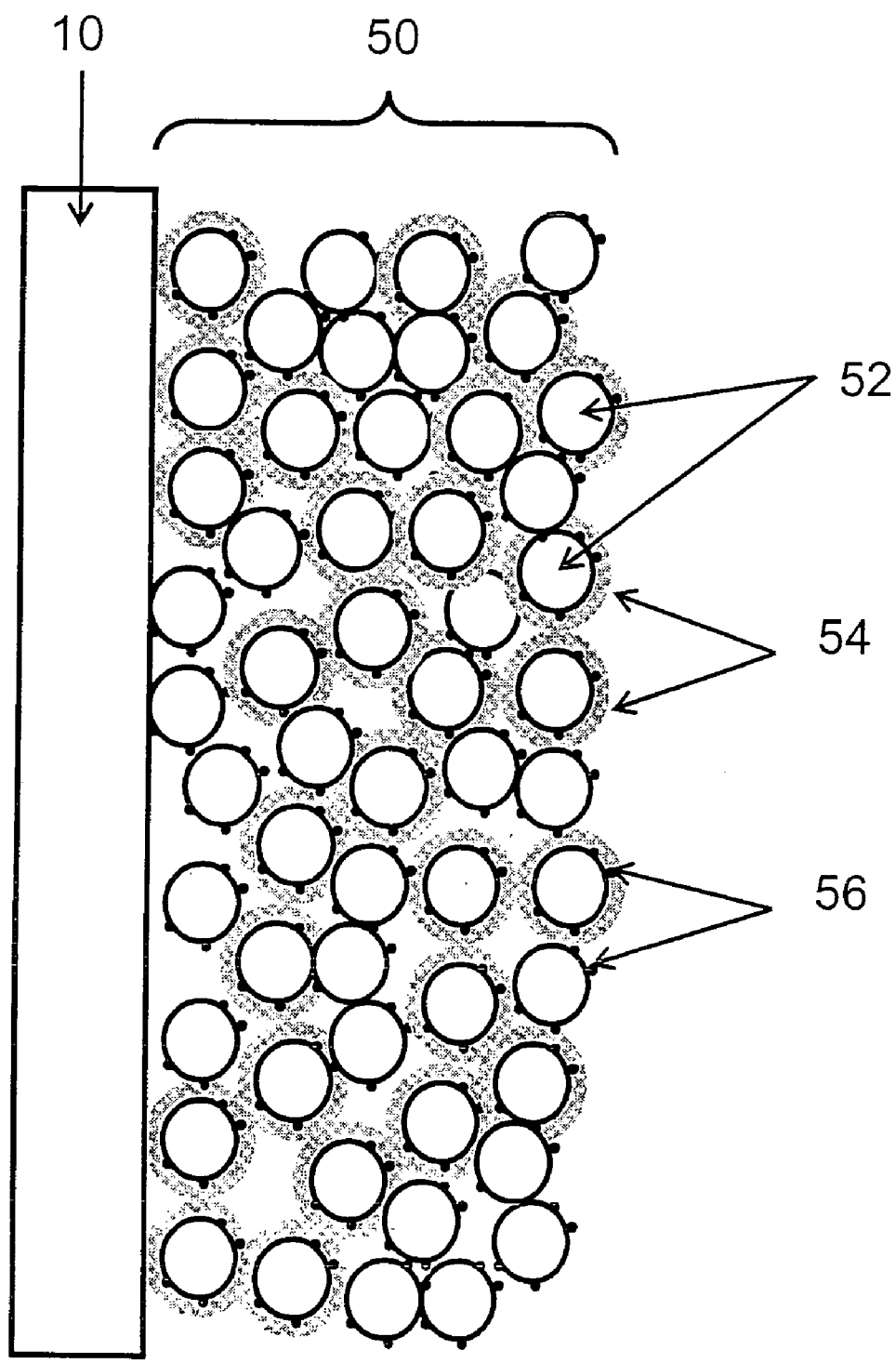
FIG. 1B shows a close up of an electrode and membrane of the PEMFC.
Figure 2:
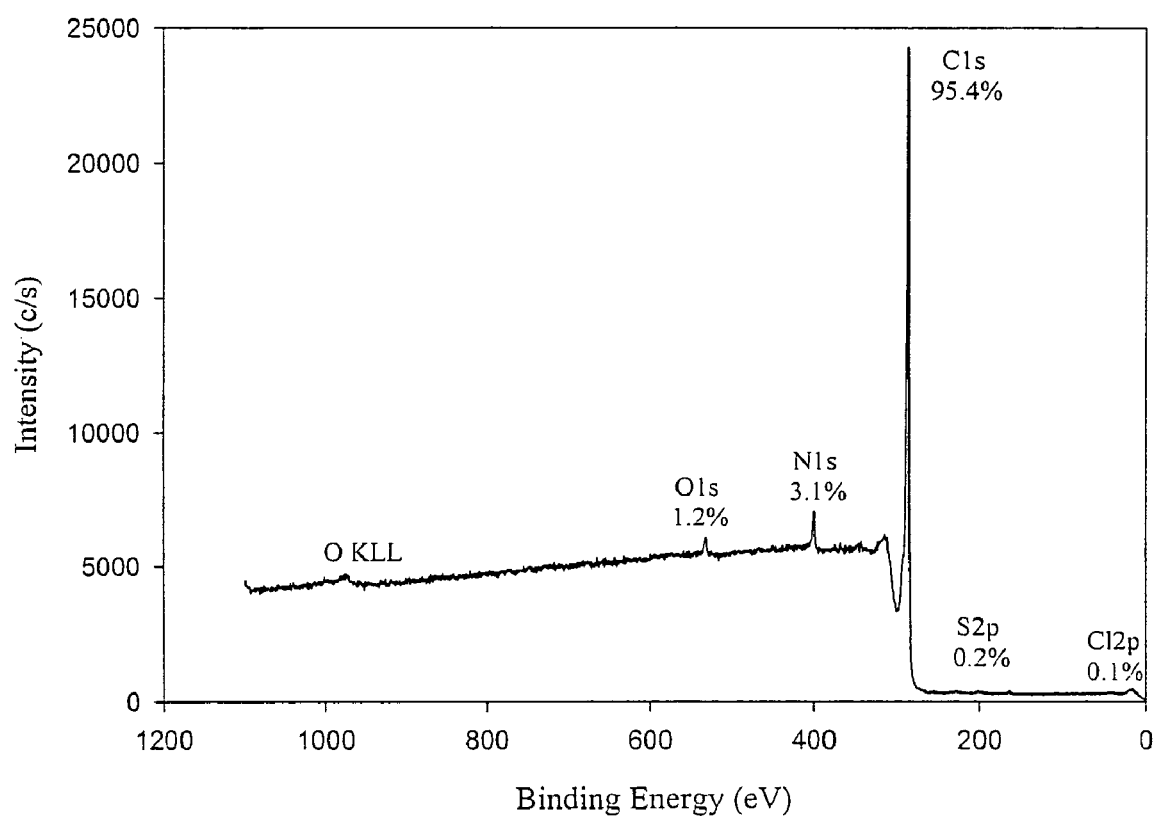
FIG. 2 is an X-ray photoelectron survey spectrum (XPS) of the polyaniline-grafted carbon black of Example 1. This figure shows the presence of the N1s peak which supports that polyaniline has indeed been grafted to the carbon black surface.

A solution containing 45 g of ammonium persulfate in 250 ml deionized water was added to the carbon black slurry, and the stirring continued at room temperature for 2 hrs. The carbon black slurry was filtered, washed with DI water, dried at 110° C. for 4 hrs., and pulverized. The resultant carbon powder contains grafted polyaniline (CB—HN—$C_6H_4$)$_n$ conducting polymer as shown in Scheme I as demonstrated by FIG. 2.

Example 2

Preparation of Polypyrrole-grafted Carbon Black

A slurry was made using
100 g CDX-975 carbon black (NSA surface area 240 m$^2$/g and oil absorption of 170 ml/100 g) (Columbian Chemical Company, Atlanta, Ga.) and
25 ml glacial acetic acid in
750 ml deionized (DI) water.

20 g pyrrole (Aldrich) was added to the slurry with continuous stirring. 100 ml of 3 M FeCl$_3$ solution was added to the carbon black slurry, and the stirring continued at room temperature for 1 hr. The carbon black slurry was filtered, washed with DI water, dried at 110° C. for 4 hrs., and pulverized. The resultant carbon powder contains grafted polypyrrole (CB—HN—C$_4$H$_2$)$_n$ conducting polymer as shown in Scheme II.

Example 3

Preparation of Polypyrrole-grafted Carbon Black

A slurry was made using
100 g CDX-975 carbon black (NSA surface area 240 m$^2$/g and oil absorption of 170 ml/100 g) (Columbian Chemical Company, Atlanta, Ga.) and
25 ml glacial acetic acid in
750 ml deionized (DI) water.

Figure 3:
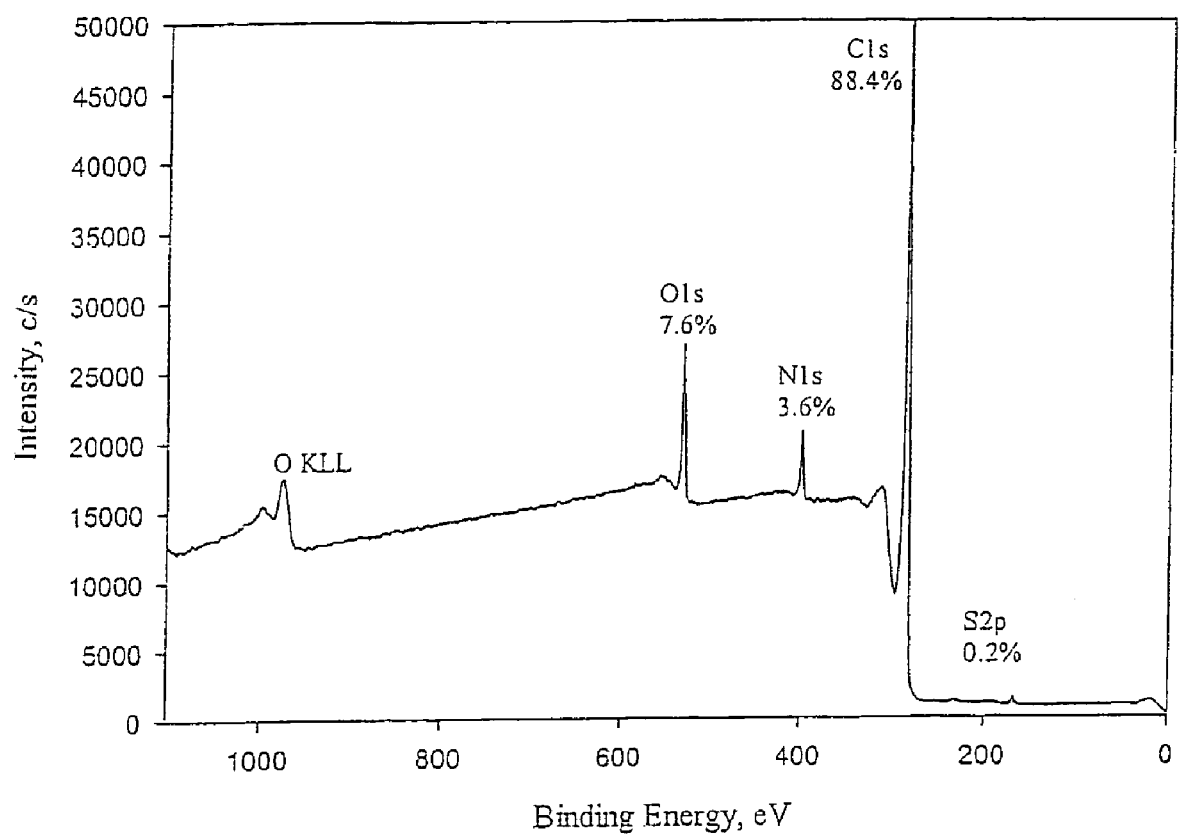
FIG. 3 is an X-ray photoelectron survey spectrum (XPS) of the polypyrrole-grafted carbon black of Example 3. This figure shows the presence of the N1s peak which supports that polypyrrole has indeed been grafted to the carbon black surface.

20 g pyrrole (Aldrich) was added to the slurry with continuous stirring. 100 ml of 10% H$_2$O$_2$ solution was added to the carbon black slurry, and the stirring continued at room temperature for 1 hr. The carbon black slurry was filtered, washed with DI water, dried at 110° C. for 4 hrs., and pulverized. The resultant carbon powder contains grafted polypyrrole (CB—HN—C$_4$H$_2$)$_n$ conducting polymer as shown in Scheme II as demonstrated in FIG. 3.

Example 4

Platinization of Polyaniline-grafted Carbon Black 4 g of polyaniline-grafted carbon black (made in Example 1) was dispersed in 300 ml DI water.

Figure 4:
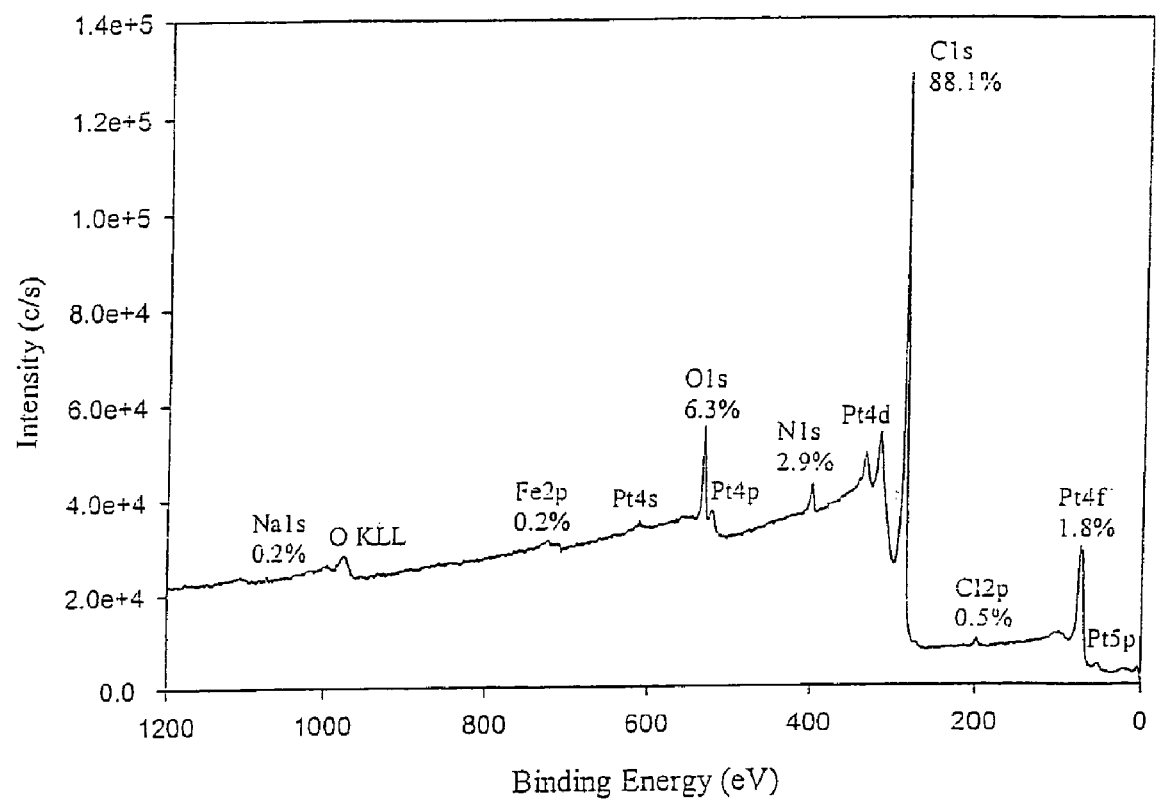
FIG. 4 is an X-ray photoelectron survey spectrum (XPS) of 20% Pt/polyaniline-grafted carbon black of Example 4. This figure shows the presence of the Pt4f peak which supports that polyaniline-grafted carbon black has been platinized.

200 ml of 1% solution of chloroplatinic acid was added dropwise for a period of 1 hr. with continuous stirring. The pH of the slurry was adjusted to 8.5 using 1 M sodium bicarbonate solution. 200 ml of 3% solution of formaldehyde was added for a period of 1 hr. and the temperature was kept at 70° C. for 1 hr. The slurry cooled to room temperature and was filtered by washing with DI water. The carbon cake dried at 110° C. for 4 hrs. and was pulverized. The resultant supported catalyst contained ~20% platinum with grafted polyaniline on the carbon surface as demonstrated in FIG. 4.

Example 5

Platinization of Polyaniline-grafted Carbon Black 4 g of polyaniline grafted carbon black (made in Example 1) was dispersed in 300 ml DI water.

200 ml of 1% solution of chloroplatinic acid was added dropwise for a period of 1 hr. with continuous stirring. 200 ml of 3% solution of formaldehyde was added for a period of 1 hr., and the temperature was kept at 70° C. for 1 hr. The slurry cooled to room temperature and was filtered by washing with DI water. The carbon cake dried at 110° C. for 4 hrs. and was pulverized. The resultant supported catalyst contained ~20% platinum with grafted polyaniline on the carbon surface.

Example 6

Platinization of Polypyrrole-grafted Carbon Black 4 g of polypyrrole grafted carbon black (made in Example 3) was dispersed in 300 ml DI water.

Figure 5:
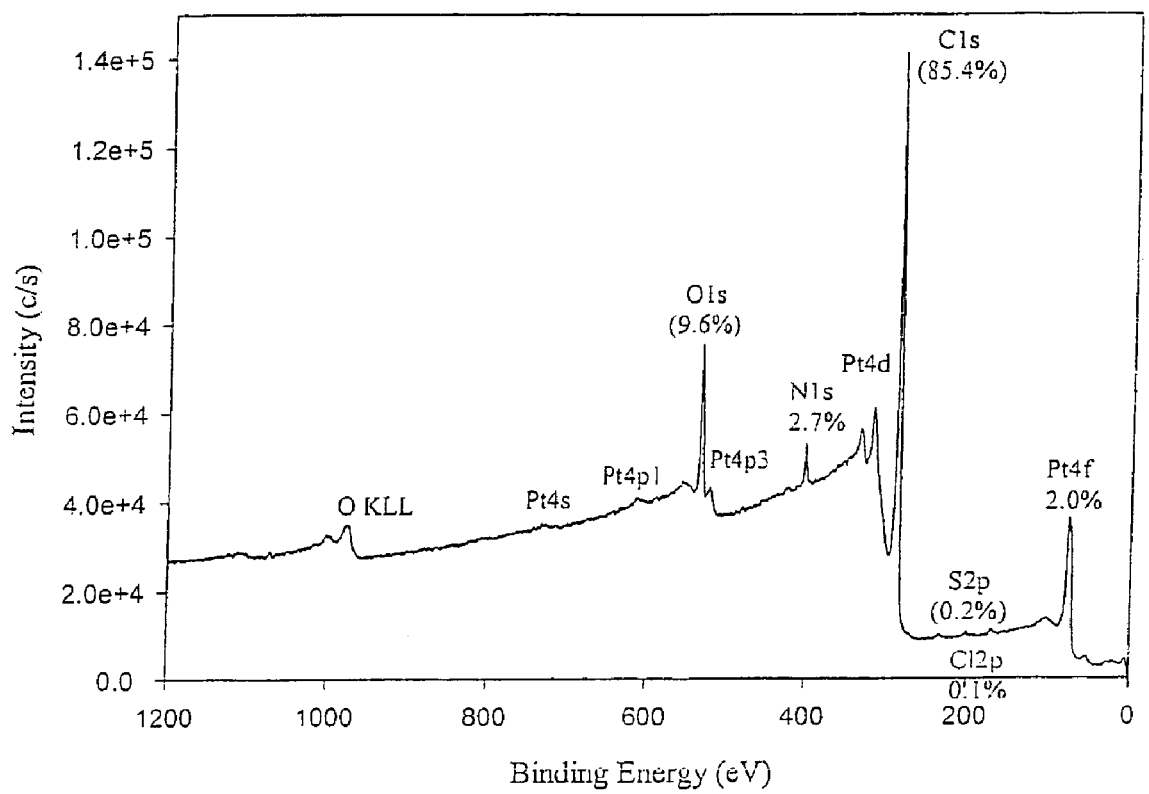
FIG. 5 is an X-ray photoelectron survey spectrum (XPS) of 20% Pt/polypyrrole-grafted carbon black of Example 6. This figure shows the presence of the Pt4f peak which supports that polypyrrole-grafted carbon black has been platinized.

200 ml of 1% solution of chloroplatinic acid was added dropwise for a period of 1 hr. with continuous stirring. The pH of the slurry was adjusted to 8.5 using 1 M sodium bicarbonate solution. 200 ml of 3% solution of formaldehyde was added for a period of 1 hr., and the temperature was kept at 70° C. for 1 hr. The slurry cooled to room temperature and was filtered by washing with DI water. The carbon cake dried at 110° C. for 4 hrs. and was pulverized. The resultant supported catalyst contained ~20% platinum with grafted polypyrrole on the carbon surface as demonstrated in FIG. 5.

Example 7

Platinization of Polypyrrole-grafted Carbon Black 4 g of polypyrrole-grafted carbon black (made in Example 3) was dispersed in 300 ml DI water.

200 ml of 1% solution of chloroplatinic acid was added dropwise for a period of 1 hr. with continuous stirring. 200 ml of 3% solution of formaldehyde was added for a period of 1 hr., and the temperature was kept at 70° C. for 1 hr. The slurry cooled to room temperature and was filtered by washing with DI water. The carbon cake dried at 110° C. for 4 hrs. and was pulverized. The resultant supported catalyst contained ~20% platinum with grafted polypyrrole on the carbon surface.

Example 8

Comparative Electronic Conductivity Measurements

Electronic conductivity was measured on pressed pellets of carbon black material using a four probe resistivity meter (Loresta AP Resistivity, MCP400, Mitsubishi Petrochemical Company, Tokyo, Japan). ASTM D257 was used.

The pellets of carbon black material included conductive carbon black alone, hybrid grafted material from Example 1 and Example 3 above, and CDX-975 carbon black alone.

The following table (Table 1) demonstrates the increase in electronic conductivity of the catalyst supports of the present invention over carbon alone.

TABLE 1

| | Electronic conductivity measured by four point conductivity probe on pressed pellet. | |
|---|---|---|
| Sample | Description | Electronic Conductivity (S/cm) |
| 1 | Standard carbon black powder used in electronically conductive applications* | 1.4 |
| 2 | 20% polyaniline/CDX-975 (Example 1) | 3.7 |
| 3 | 20% polypyrrole/CDX-975 (Example 3) | 3.6 |
| 4 | CDX-975 beads* | ~0.8-0.9 |

*Somewhat difficult to make a pellet out of carbon black without a binder to be able to measure electronic conductivity

Example 9

Comparative Metal Dispersion Measurements

Samples of a 20% Pt loaded HiSPEC™ catalyst, the catalyst of Example 4 above, and the catalyst of Example 6 above were subjected to X-ray diffraction analysis to determine the dispersion of metal (Pt) within each of them.

Figure 6:
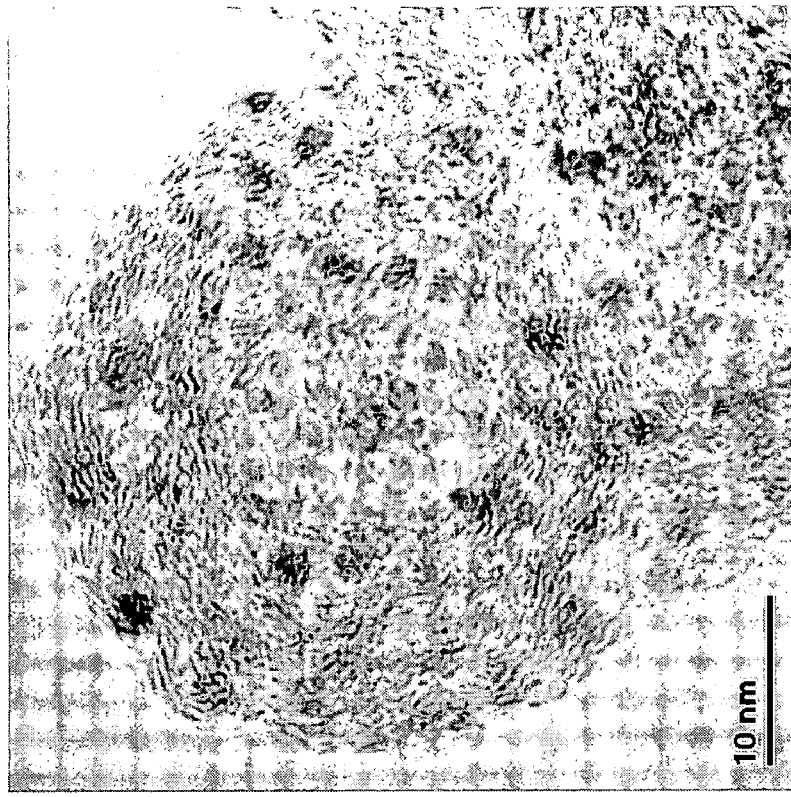
FIG. 6 is a photomicrograph (TEM) of a commercial catalyst (20% Pt/XC72), A, versus a catalyst of the present invention (20% Pt/polyaniline grafted CDX-975), B. The TEM shows the better Pt dispersion on the polyaniline-grafted CDX-975.
Figure 6:
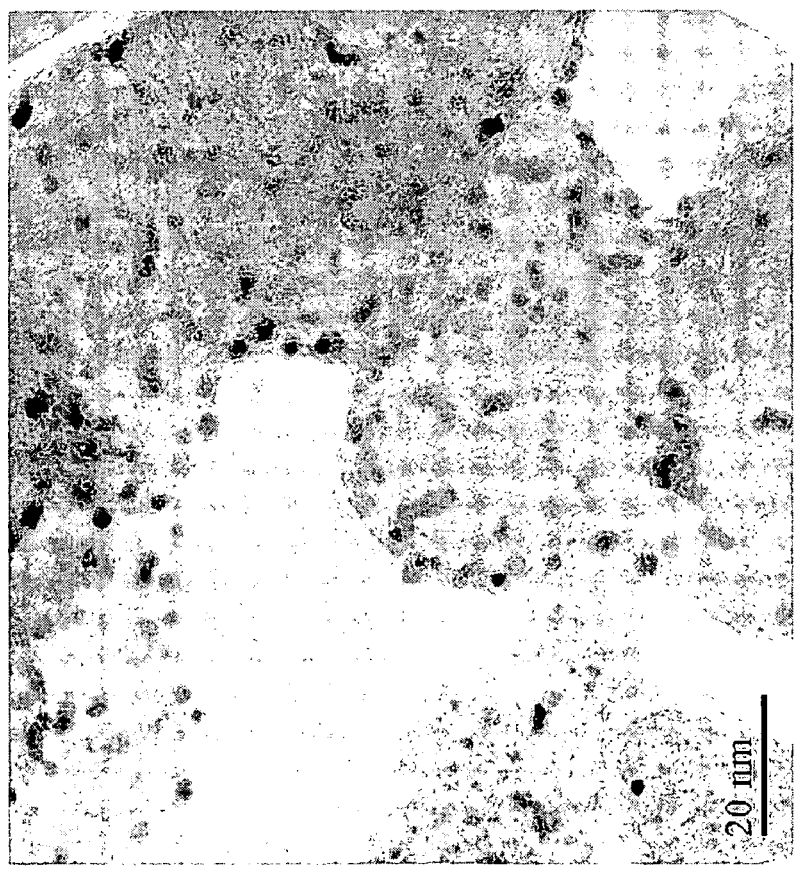

The following table (Table 2) compares the dispersion of Pt on carbon black (bulk, average value) in the supported catalysts of the present invention relative to a HiSPEC™ supported catalyst. See also FIG. 6.

TABLE 2

X-ray diffraction analysis of Pt dispersion in carbon black supported catalysts.

| Sample | Description | Pt particle size, avg. (nm) (Pt 111 peak, single max peak) |
|---|---|---|
| 1 | 20% Pt/XC72 (HiSPEC ™, Johnson Matthey) | 3.0 (3-5 typical) |
| 2 | 20% Pt/polyaniline-grafted CDX-975 (Example 4) | 1.5 |
| 3 | 20% Pt/polypyrrole-grafted CDX-975 (Example 6) | 4.2 |

Example 10

Preparation of Polyaniline-grafted Carbon Black

This method describes grafting of polyaniline to carbon black surface by oxidative polymerization using ozone. 150 g carbon black beads (CDX-975, NSA surface area 240 $m^2/g$ and oil absorption of 170 ml/100 g) (Columbian Chemicals Company, Atlanta, Ga.) was pulverized, and 30 g aniline (Aldrich) in 50 g of deionized water was sprayed onto the carbon black powder. This was followed by additional pulverization for 3 min. The resultant carbon black mixture was transferred to a rotating drum and purged with ozone for 1 h (1000W, @ 4 ml/min) using Ozat® compact ozone generator made by Ozonia Corporation, Switzerland. The resultant carbon powder contained polyaniline-grafted conducting polymer as shown in Scheme III. FIG. 8 shows the X-ray photoelectron survey spectrum of polyaniline-grafted carbon black containing the nitrogen functionality from polyaniline.

Example 11

Preparation of Polypyrrole-grafted Carbon Black

This method describes grafting of polypyrrole to carbon black surface by oxidative polymerization using ozone. 150 g carbon black beads (CDX-975, NSA surface area 240 $m^2/g$ and oil absorption of 170 ml/100 g) (Columbian Chemicals Company, Atlanta, Ga.) was pulverized, and 30 g pyrrole (Aldrich) in 50 g of deionized water was sprayed onto the carbon black powder. This was followed by additional pulverization for 3 min. The resultant carbon black mixture was transferred to a rotating drum and purged with ozone for 1 h (1000W, @ 4 ml/min) using Ozat® compact ozone generator made by Ozonia Corporation, Switzerland. The resultant carbon powder contained polypyrrole-grafted conducting polymer as shown in Scheme IV. FIG. 9 shows the X-ray photoelectron survey spectrum of polypyrrole-grafted carbon black containing the nitrogen functionality from polypyrrole.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for preparing a carbon with enhanced electronic conductivity comprising
   oxidatively polymerizing with an oxidizing agent comprising ozone a monomer of a conducting polymer containing a hetero atom with particulate carbonaceous material to form a conducting polymer-grafted carbonaceous material; and then metallizing the conducting polymer-grafted carbonaceous material.

2. The method of claim 1, wherein the carbonaceous material comprises carbon black, graphite, nanocarbon, fullerene, fullerenic material, finely divided carbon, or a mixture thereof.

3. The method of claim 1, wherein the carbonaceous material comprises carbon black.

4. The method of claim 1, wherein the monomer of a conducting polymer comprises an amino aryl or a nitrogen heterocycle.

5. The method of claim 1, wherein the oxidatively polymerizing comprises adding ozone to a mixture of the carbonaceous material and the monomer of the conducting polymer.

6. The method of claim 5, wherein the mixture of the carbonaceous material and the monomer of the conducting polymer further comprises an acid solvent to form a slightly acidic environment.

7. The method of claim 6, wherein the slightly acidic environment is a pH of about less than 7.

8. The method of claim 6, wherein the slightly acidic environment is a pH of about 3 to about 4.

9. The method of claim 1, wherein the conducting polymer comprises polyaniline, polypyrrole, polyfuran, polythiophene, poly(p-phenylene-oxide), poly(p-phenylene-sulfide), a substituted conducting polymer, or a mixture thereof.

10. The method of claim 1, wherein the metallizing comprises adding a metal-containing material to the conducting polymer-grafted carbonaceous material.

11. The method of claim 10, wherein the metallizing further comprises adding a reducing agent.

12. The method of claim 1, wherein the metallizing comprises platinizing.

13. The method of claim 11, wherein the reducing agent comprises formaldehyde, sodium borohydride, hydrogen, hydrazine, hydroxyl amine, or a mixture thereof.

14. The method of claim 10, wherein the metal-containing material comprises chloroplatinic acid, platinum nitrate, platinum halide, platinum cyanide, platinum sulfide, organoplatinum salt, or a mixture thereof.

* * * * *